US012558287B2

(12) United States Patent
Rizzo et al.

(10) Patent No.: US 12,558,287 B2
(45) Date of Patent: Feb. 24, 2026

(54) COMPRESSION DEVICE ESPECIALLY FOR PREVENTING DEEP VEIN THROMBOSIS

(71) Applicant: Recovery Force, LLC, Fishers, IN (US)

(72) Inventors: Vincent Rizzo, Westfield, IN (US); Kevin A. Mauser, Indianapolis, IN (US)

(73) Assignee: Recovery Force, LLC, Fishers, IN (US)

( * ) Notice: Subject to any disclaimer, the term of this patent is extended or adjusted under 35 U.S.C. 154(b) by 654 days.

(21) Appl. No.: 18/145,469

(22) Filed: Dec. 22, 2022

(65) Prior Publication Data

US 2023/0127829 A1 Apr. 27, 2023

Related U.S. Application Data

(63) Continuation-in-part of application No. 17/453,742, filed on Nov. 5, 2021, which is a continuation-in-part (Continued)

(51) Int. Cl.
*A61H 9/00* (2006.01)

(52) U.S. Cl.
CPC ... *A61H 9/0092* (2013.01); *A61H 2201/0196* (2013.01); *A61H 2201/1207* (2013.01); *A61H 2201/5061* (2013.01); *A61H 2209/00* (2013.01)

(58) Field of Classification Search
CPC .......... A61H 9/0092; A61H 2201/0196; A61H 2201/1207; A61H 2201/5061; A61H 2209/00; A61H 2011/005; A61H 2201/0192; A61H 2201/1215; A61H 2201/14; A61H 2201/1472; A61H 2201/164; A61H 2201/1642; A61H 2201/165; A61H 2201/1685;

(Continued)

(56) References Cited

U.S. PATENT DOCUMENTS 7,354,407 B2 * 4/2008 Quintana ............. A61H 31/006 601/41
2003/0009115 A1 * 1/2003 Sherman ............. A61H 31/005 601/44

(Continued)

FOREIGN PATENT DOCUMENTS

WO WO-2015089383 A1 * 6/2015 ............. A61H 11/00

OTHER PUBLICATIONS

International Search Report and Written Opinion of corresponding application PCT/US2023/084891, dated Apr. 19, 2024 (15 pages).

*Primary Examiner* — Kendra D Carter
*Assistant Examiner* — Arielle Wolff
(74) *Attorney, Agent, or Firm* — Maginot, Moore & Beck, LLP

(57) ABSTRACT

A compression device particularly suited for DVT prophylaxis includes a disposable wrap and a re-usable controller removably mounted on the wrap to apply a tensioning force to the wrap when it is encircling the limb of a patient. The wrap includes a strap wrapped around an electric motor-driven pulley, with an encoder to determine the amount of rotation of the pulley and a current sensor to determine the current load on the motor during operation. A pretension protocol sets the pulley of the wrap at a proper frap position so that the wrap can properly execute a DVT prophylaxis protocol.

4 Claims, 27 Drawing Sheets

Related U.S. Application Data of application No. 16/372,602, filed on Apr. 2, 2019, now Pat. No. 11,173,095, and a continuation of application No. 16/740,615, filed on Jan. 13, 2020, now Pat. No. 11,179,291.

(58) Field of Classification Search
CPC .... A61H 2201/1688; A61H 2201/1697; A61H 2201/5007; A61H 2201/5046; A61H 2201/5058; A61H 2201/5064; A61H 2201/5084; A61H 2201/5097; A61H 2205/10; A61H 2205/106; A61H 11/00
See application file for complete search history.

(56) References Cited

U.S. PATENT DOCUMENTS

| | | | | |
|---|---|---|---|---|
| 2013/0085428 | A1* | 4/2013 | Deshpande .......... | A61H 9/0092 601/148 |
| 2017/0312165 | A1* | 11/2017 | Johnson ............... | A61B 5/4842 |
| 2020/0315906 | A1 | 10/2020 | Rizzo et al. | |
| 2021/0378909 | A1 | 12/2021 | Freidenrich et al. | |

* cited by examiner

Pretension Logic

Target Median = 530.
TargetMin = 400.
TargetMax = 660.

(1) :Force > Loosen @ 150mSec. STRAP TOO TIGHT.

(2) :Force = Tighten and Cnt < Target Min. STRAP TOO TIGHT.

(3) :Force <= Tighten and Cnt > Target Max. STRAP TOO LOOSE.

(4) :Force <= 4.0 lbs and Cnt = 880 STRAP TOO LOOSE.

(5) :Force is in Target Zone. PERFORM DVT PROPHYLAXIS

COMPRESSION DEVICE ESPECIALLY FOR PREVENTING DEEP VEIN THROMBOSIS

REFERENCE TO RELATED APPLICATION

This application is a continuation-in-part of and claims priority to co-pending application Ser. No. 17/453,742, filed on Nov. 5, 2021, which is a continuation-in-part of and claims priority to application Ser. No. 16/372,602, filed on Apr. 2, 2019, which issued as U.S. Pat. No. 11,173,095, and which is a continuation of and claims priority to application Ser. No. 16/740,615, filed on Jan. 13, 2020, which issued as U.S. Pat. No. 11,179,291, the entire disclosures of which is incorporated herein by reference.

BACKGROUND

The human circulatory system includes arteries that direct oxygen-rich blood throughout the body. The veins are the blood vessels that return the oxygen-poor blood and waste products from the body back to the heart to be recycled through the lungs and liver. Veins include tiny valves that keep the blood moving back toward the heart, rather than collecting at an extremity.

Deep vein thrombosis (DVT) occurs when a blood clot forms in one or more of the deep veins of the body or when one or more of the valves in a vein has been compromised by a clot. DVT can develop from certain medical conditions that affect how the blood clots or that affect blood flow, typically in extremities such as the legs. DVT can be very serious because the blood clots can break loose, travel through the blood stream and lodge in another location, blocking blood flow to the body in that location.

DVT can occur when a person's legs remain still for long periods because the leg muscles are not contracting to help blood circulate. DVT can often occur during and as a result of surgery. It has been found that DVT conditions arise after a patient has been on an operating table for as little as 20 minutes. The DVT risk increases for prolonged recovery times after surgery during which the patient may spend the great majority of each day in bed. A treatment of choice to reduce the risk of blood clots and DVT is to get the patient up and walking as soon as possible after the surgery.

Another preferred treatment, usually in addition to walking, is the use of a compression device that is wrapped around the extremity, usually the lower leg. The compression device applies intermittent compression to the limb to promote blood flow through the veins back to the heart. The cyclic compression can also promote the natural release of substances in the body that help prevent clots. The typical DVT compression device is a pneumatic device that pumps air into a hollow cuff encircling the affected limb to apply pressure to the limb. This pressure squeezes the veins, forcing blood out of the veins toward the heart. The pressure is released by venting the cuff, allowing it to deflate. This cycle of inflation and deflations continues for as long as the cuff is worn by the patient.

For DVT prevention, patient compliance is a necessity, meaning that the patient wears an active DVT cuff for the prescribed time and the patient leaves the hospital bed to walk for a prescribed duration. However, patient compliance is often very problematic. One problem is that a DVT cuff is uncomfortable to wear for extended lengths of time, yet the recommendations to prevent DVT can exceed in upwards of 18 hours a day. Some DVT cuffs include means for monitoring the amount of time the cuff has been activated and run through its pressure cycle. However, some patients—particularly patients for whom the DVT cuff is prescribed for home care—find ways to "trick" the DVT cuff by mounting the cuff on a rigid object and allowing the cuff to inflate and deflate on the inanimate object.

Another problem is that the DVT cuff is not conducive to patient mobility. The typical DVT cuff requires a source of pressurized air to inflate the cuff during the pressure cycle. Early systems utilized a large pump unit that sat on the floor next to the patient's bed. Smaller pumps were later developed that could be carried by the patient. However, many patients, particularly elderly patients, lack the strength and/or stamina to carry around a pneumatic pump connected to a DVT cuff worn on the patient's leg. Moreover, the pneumatic hose between the pump and the cuff can be an entanglement nuisance.

There is a need for a compression device that is particularly suited for DVT prevention and that is mobile. There is also a need for a compression device that can ensure patient compliance, or at least ensure that the non-compliant patient cannot "trick" the DVT cuff into appearing to have been properly used.

SUMMARY OF THE DISCLOSURE

A compression device comprises a disposable wrap that is configured to be wrapped around the limb of a patient, and a reusable controller that is removably mounted to the disposable wrap. The controller is a non-pneumatic device that is operable to contract the wrap around the patient's limb in a controlled fashion and according to a predetermined compression protocol. In one aspect, the compression protocol is adapted as a prophylaxis for deep vein thrombosis, although other compression protocols are possible.

In one aspect, the controller includes a DC motor and transmission to gear down the rotational output speed of the motor to a speed suitable for use in contracting the wrap. The wrap is connected at a looped end to a D-ring connected to a pull strap that is in turn mounted to a pulley that rotates with the motor to wind the pull strap at least partially around the pulley. The opposite end of the wrap includes a controller mount that allows for removable mounting or attachment of the controller to the wrap. In one embodiment, the controller mounting arrangement includes a load cell at the interface between the wrap and the controller that is configured to measure a tension force generated as the wrap is tightened on the patient's limb. In one specific embodiment, the controller mounting arrangement utilizes a load cell axle engaged within a pair of clips affixed to the wrap. In another specific embodiment, a keyed hinge arrangement is provided between the wrap and a housing of the controller. The controller mounting arrangement is configured to allow the controller to be removed from the wrap and replaced with another controller as desired.

The controller can include an accelerometer or position sensor to sense the physical position and movement of the patient. Data from the accelerometer or position sensor are provided to an on-board digital processor, such as a microprocessor, that generates compliance data that can be uploaded or displayed on a display screen of the compression device.

In another feature, an RF chip or tag is provided on the wrap that can be specifically associated with a patient. The controller includes an RF sensing circuit that detects the RF chip and reads information from the chip, including a unique identifier. Concordance between the unique identifier on the chip and a data base of known valid identifiers maintained in the controller is required before the controller is operable.

The unique identifier associated with the wrap, and thus with the patient, follows the wrap regardless of which controller is mounted to the wrap. This feature allows the same wrap to be recognized as the patient moves from one unit of a hospital to another.

The compression device of the present disclosure is a non-pneumatic wearable device that permits patient mobility. Thus, the patient is not restricted to a hospital bed or chair during a compression protocol. Moreover, the sensors and microprocessor of the controller is configured to monitor the amount of time that the patient spends lying down/reclined, seated/standing or moving while wearing the device. The controller displays information indicative of the manner of activity while wearing the device.

In another feature of the present disclosure, the non-pneumatic mobile compression device disclosed herein is configured to apply a compression profile that reduces the risk of DVT. In particular, the controller of the device is configured to apply compression to the patient's limb/leg that achieves a blood flow velocity that has been found to reduce or eliminate the risk of DVT. The device is operable to generate a blood flow velocity that is about three times greater than the baseline velocity of the patient.

In a further feature of the compression device, the processor determines a patient-specific Body Compression Index (BCI) corresponding to the range of movement of the wrap or pull strap between the predetermined pre-tension and maximum compression forces applied to the patient during a compression protocol. The (BCI) ensures a consistent application of the minimum and maximum compression forces regardless of any physiological changes in the patient, such as swelling of a limb.

In another aspect of the present disclosure, a Mobility Health Index (MHI) number is calculated as a function of data indicative of patient compliance to his/her recovery protocol. The data can include the amount of time that the compression device is worn and operating in a DVT prophylaxis mode, the amount of time spent sitting or lying down and the amount of walking undertaken by the patient. The MHI provides a direct measure of how the patient is progressing toward recovery goals established by medical personnel. The MHI can be displayed on the compression device worn by the patient as well as on a separate display used by medical personnel to quickly assess the patient's progress.

DETAILED DESCRIPTION

Figure 1:
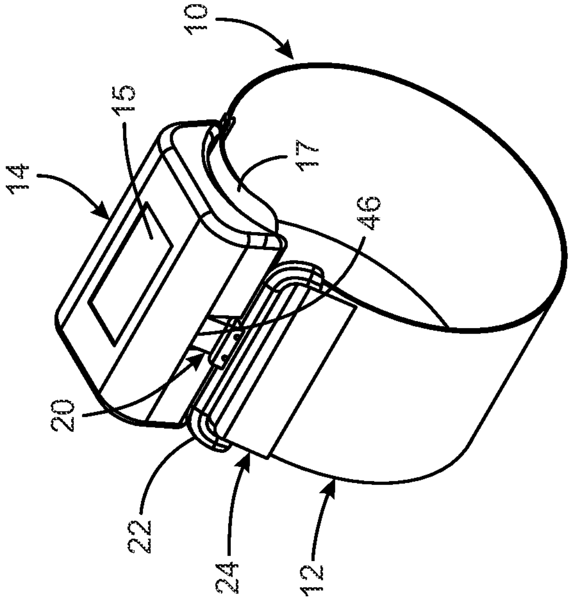
FIG. 1 a perspective view of a compression device according to one embodiment of the present disclosure.
Figure 2:
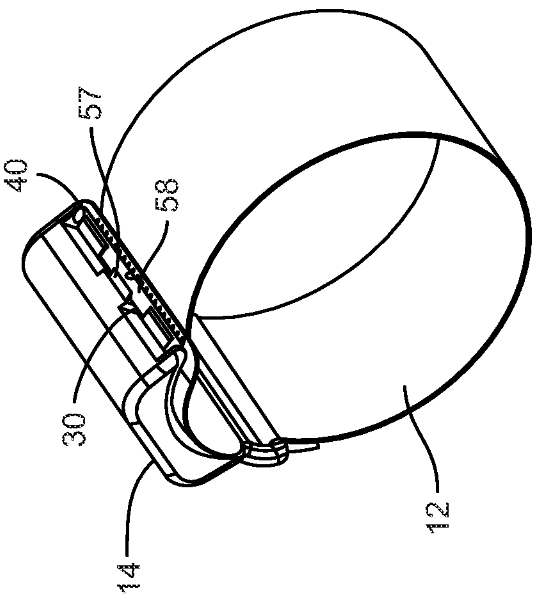
FIG. 2 is another perspective view of the compression device shown in FIG. 1.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains A compression device 10, shown in FIGS. 1-6, includes a wrap 12 and a controller 14 mounted on the wrap. The wrap 12 is a flexible sheet of material configured to be wrapped around a part of a person's body. For a DVT cuff, the wrap is particularly sized to be wrapped around the lower leg or calf of a person. In order to properly combat the onset of DVT it has been found that the wrap should have a width of about 4.0 inches to apply the compression force over a sufficient area of the patient's limb, most particularly on the calf. The wrap 12 is preferably formed of a "breathable" material with no, or at most minimal, elasticity or "stretchability", such as a breathable polyester fabric. The "breathability" of the fabric is important to prevent overheating of the patient's limb about which the cuff is wrapped. This characteristic makes the wrap more tolerable for the patient when wearing the wrap for long periods. With respect to the "stretchability", in order to maintain accurate compression the wrap should not stretch more than 0.5 inches when the compression device is at its maximum tension or compression force. The material of the wrap can also include wicking features that allows wicking of sweat from the skin surface to the outside of the wrap. A suitable hi-tech polyester fabric can combine suitable wicking capability with breathability to improve user comfort.

The wrap includes a flap 17 fastened at one end to the wrap 12. The flap is arranged beneath the controller 14 and can operate to protect the patient's skin from any heat generated by the controller 14 or by patient's skin. The flap 17 may be formed of the same material as the wrap 12, or may be formed of a different material adapted to cushion the skin from pressure induced the controller and/or heat from the controller or the patient's skin. When the wrap 12 encircles a limb the flap 17 is not applying any pressure to the limb since it has a free end beneath the controller 14.

Figure 3:
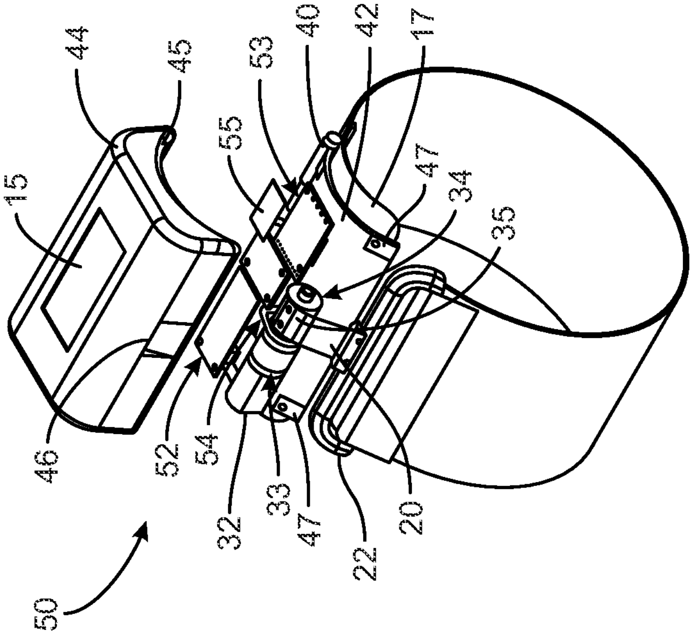
FIG. 3 is a partially exploded perspective view of the compression device shown in FIG. 1.
Figure 4:
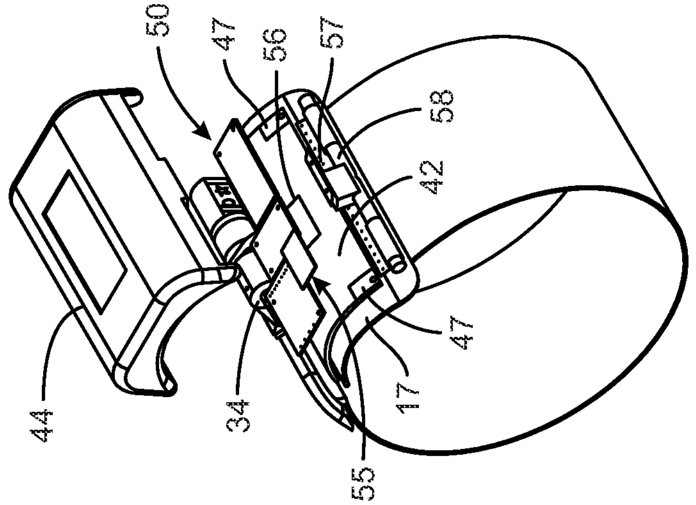
FIG. 4 is another partially exploded perspective view of the compression device shown in FIG. 3.

The controller 14 includes a base plate 42 and a cover 44 that contains the drive components and electronics of the cuff. The cover 44 can be fastened to the base plate 42 at a plurality of latches 47 preferably located at the corners of the plate, as shown in FIGS. 3-4.

The wrap 12 includes an end loop 24 that is configured to be removably wrapped around a D-ring 22 connected to the controller 14. The end loop 24 can include releasable facing surfaces, such as a hook-and-loop or VELCRO®-type fastener, so that the wrap can pass through the D-ring and overlap itself to form the end loop. It can be appreciated that the releasable facing surfaces can have a length sufficient to allow varying amounts of overlap. This allows the DVT cuff to be snugly wrapped around the patient's limb, regardless of the size of the patient.

Figure 6:
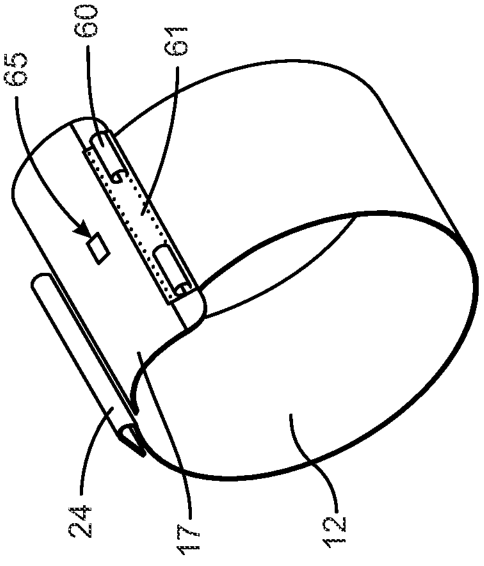
FIG. 6 is a perspective view of a disposable wrap of the compression device shown in FIG. 1.

The opposite end of the wrap includes a mounting arrangement 40 that includes a pair of clips 60 affixed to a mounting plate 61, as best seen in FIG. 6. The mounting plate 61 is fastened to the end of the wrap 12. The wrap is essentially anchored to the controller 14 at the mounting arrangement 40, with the opposite end connected to the D-ring 22 capable of movement as the wrap is tightened, as described herein. In one important feature of the present disclosure, the wrap 12 is configured to be independent of the controller 14 with features that connect the wrap to the controller. The wrap 12 can thus be a disposable component. Moreover, this feature allows the wrap 12 to remain with the patient even as a new controller 14 is provided. In one embodiment, the flap 17 can be configured to removably engage the end loop 24 of the wrap, and particularly the releasable facing (VELCRO®) surface of the loop. Alternatively, the underside of the wrap adjacent the mounting arrangement 40 can be configured to engage the facing surface of the loop. This feature allows the wrap to be retained on the patient's limb without the controller, while awaiting a new controller.

The clips 60 are configured to removably receive an axle 58, and in one embodiment can be in the form of spring clips or the like that can be elastically pushed to allow entry of the axle into the clip. The clips are sufficiently flexible to allow the axle to be pushed into the clip, but also sufficiently strong to prevent the axle from being dislodged during a compression cycle of the cuff 10. The axle provides a connection to a load cell 57, as best seen in the enlarged view of FIG. 5. The axle 58 includes a pull bar 30 affixed at one end to the axle and at an opposite end to the load cell 57. In one embodiment, the load cell is in the form of a plate that carries a strain gage 57*c*. One end of the load cell plate 57 is fastened to the base plate 42 at a mounting pad 57*a*, such as by a screw or other suitable fastener. The other end of the load cell plate 57 is fastened at mounting pad 57*b* to the pull bar 30. The load cell 57 thus serves as a connection interface between the mounting arrangement 40 at one end of the wrap 12 and the controller 14.

The other end of the wrap that includes the end loop 24 is connected to the D-ring 22, which is itself connected to a pull strap 20 that passes through a slot 46 in the housing 44, as shown in FIG. 1. The strap 20 is engaged at a mount 35 to a pulley 34 that is driven by an electric motor 32. The motor is fastened to the base plate 42, thereby closing the loop around the patient's limb. In other words, the wrap 12 is removably fastened at the end loop 24 to the controller 14 by way of the D-ring 22, pull strap 20, pulley 34 and motor 32, while the opposite end of the wrap 12 is removably anchored to the controller by way of the mounting arrangement 40 and load cell 57.

As noted above, the load cell 57 provides one connection interface between the controller 14 and the wrap 12 that is encircling the patient's limb. Since the axle 58 is retained on the wrap by the clips 60, the axle, and thus the pull bar 30 is pulled by a circumferential force as the wrap is tightened around the circumference of the patient's limb. This force thus tends to bend the load cell plate 57 since one end of that plate is fastened to the pull bar and the other end is essentially cantilever mounted to the base plate 42 of the controller 14. As the plate bends, the strain gage 57*c* mounted to the surface of the plate elongates. The strain gage 57*c* is connected by wires 57*d* to the electronics of the controller that is configured to interpret the measured strain, and convert this measured strain to a force value.

In an alternative embodiment, the load cell 57 is eliminated in favor of a direct mount between the pull bar 30 and the controller 14, or more particularly the base plate 42 of the controller. In this embodiment, the circumferential force generated in the wrap as it is tightened about the patient's limb can be determined by a motor-related sensor. One such sensor can be a current sensor for the motor 32 that measures the current through the DC motor. The current required to maintain the motor rotational speed (at a given voltage) is a measure of the resistive force from the wrap as it is tightened. The current sensor can be connected to the electronics of the controller that is configured to interpret the measured current and convert this current to a force value.

Figure 5:
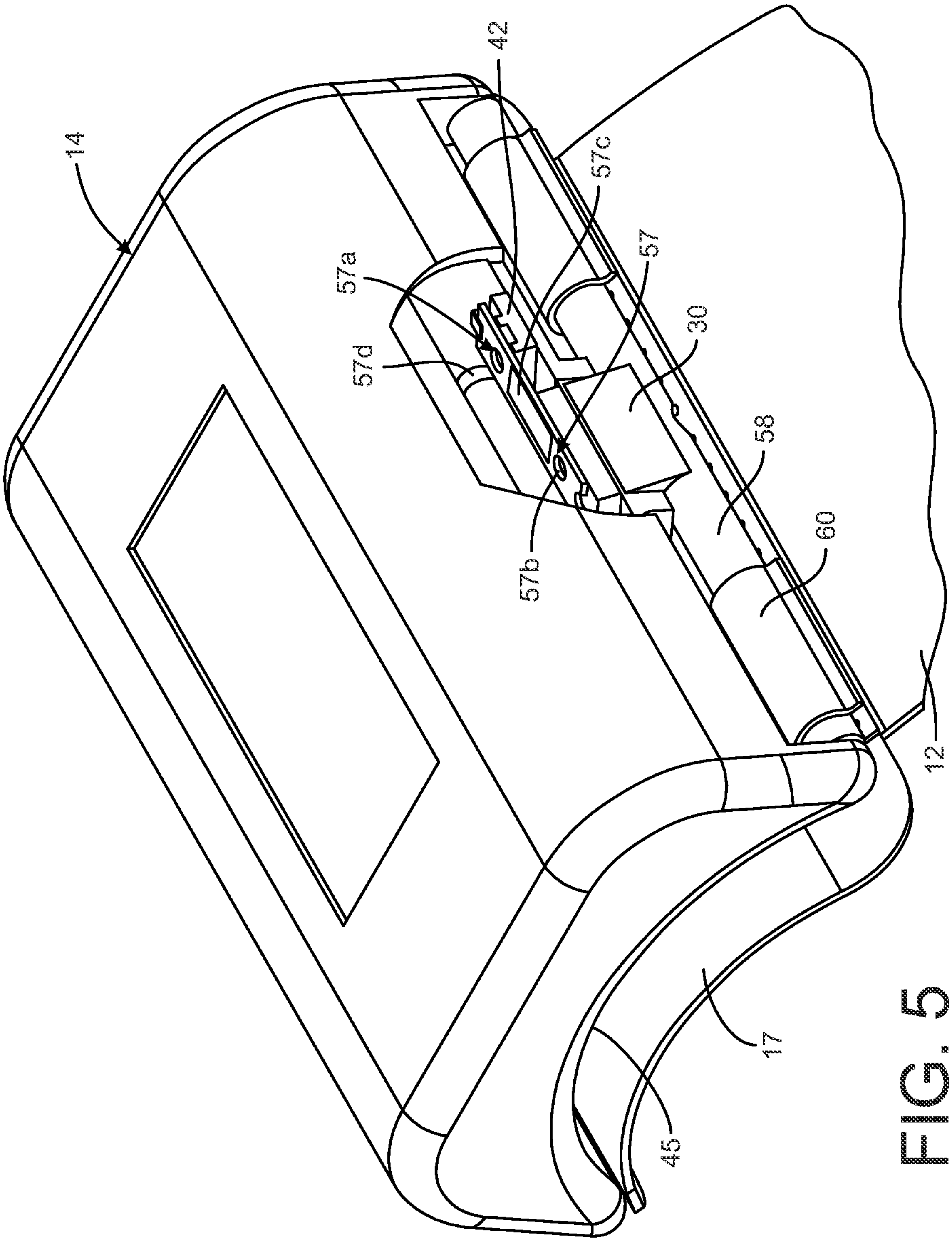
FIG. 5 is an enlarged view of the load cell attachment for the compression device shown in FIGS. 1-4.

In one feature of the DVT cuff, the controller 14, and particularly the base plate 42, defines a curved surface 45 facing the patient's limb when the cuff is wrapped around the limb, as best seen in FIG. 5. The curvature of the curved surface is configured so that the surface does not contact the patient's skin, even through the flap 17. Instead, the curvature of the surface 45 is configured as a visual and physical guide for proper orientation of the DVT cuff 10 on the patient's limb. For instance, the controller can be configured to be arranged on the ventral side of the lower leg, adjacent the tibia. The curvature of the surface 45 prevents direct pressure on the bone, which can be uncomfortable as the wrap is tightened and released on the leg. Instead, the compression pressure is limited to the wrap 12 and at the side edges of the controller 14 on either side of the tibia. In one specific embodiment, the curved surface 45 can be defined at a radius of at least 1.5 ins.

Returning to the drive train for the controller 14, the pulley 34 can be coupled to the motor 32 by way of a transmission 33 that is configured to reduce the rotary speed and increase the torque of the output driving the pulley. In one specific embodiment, the transmission can be configured for a 388:1-488:1 speed reduction. For a DVT device, a certain compression protocol requires a no-load output speed of at least 30 rpm and a torque of at least 310 in-ozs. The motor specifications and the reducer drive train of the transmission can be selected to achieve these output characteristics.

The motor 32 is driven by control circuitry 50 that controls the activation of the motor to wind and unwind the pull strap 20 about the pulley 34. The control circuitry thus includes a digital processor, such as a microprocessor 52, and a motor controller 53. The microprocessor includes one or more stored programs that control the motor controller according to a compression profile and that control the transfer of data to and from the controller 14. The control circuitry 50 can include a pulley sensor 54, electrically connected to the microprocessor, which is configured to determine the position of the pulley as it rotates to wind and unwind the pull strap 20. The load cell 57 (or current sensor in the alternative embodiment) is also electrically connected to the microprocessor and is configured to provide a measure of the tension in the wrap 12, which is directly related to the amount of compression applied to the patient's limb. For certain features of the DVT cuff 10, the control circuitry can also include an accelerometer 55 electrically connected to the microprocessor and operable to provide motion data indicative of the position, attitude and movement of the patient.

The cuff 10 is provided with a visual display 15 in the cover 44 that is also connected to the microprocessor. The display 15 can display information regarding the operation of the cuff and/or indicative of the compliance of the patient wearing the cuff. In one aspect, the display can be a touch screen device that allows medical personnel to scroll through different screens displaying different information. The display 15 can be an electronic paper or E-ink display that reduces the power requirements for maintaining the display. A battery (not shown) is contained within the controller 14, such as in the space between the microprocessor 52 and the base plate 42, to provide electrical power to all of the electrical components of the control circuitry 50. The battery is preferably rechargeable. The controller can include a jack for receiving a cable for connecting to a charging station, or can include circuitry permitting proximity charging of the battery.

In a further feature of the disclosed DVT cuff, the control circuitry 50 includes an RF (radio frequency) sensor 56 in communication with the microprocessor 52. The RF sensor 56 is configured to detect an RF chip 65 integrated into the wrap 12. In one embodiment shown in FIG. 6, the chip 65 is situated on the flap 17' of the wrap 12. In one aspect of the present disclosure, the RF chip includes an RFID feature, providing a unique identification for the specific wrap 12. With this feature, the disposable wrap 12 can be uniquely associated with a particular cuff worn by a particular patient. The RF chip is read by the sensor 56 of a controller 14 mounted to the wrap. Software within the microprocessor can control the functionality or operability of the DVT cuff based on the unique identification of the RF chip. In one aspect, the microprocessor allows the DVT cuff to operate only if there is concordance between the unique identification of the RF chip and a data base of known identifications.

The RF chip 65 is also configured to store data regarding the operation of the DVT cuff 10 and the patient's compliance. In one aspect, the chip is provided with sufficient memory to store data continuously for 30 days. The microprocessor of the controller 14 is configured to upload the stored data from the RF chip, via the RF circuit 56, into an on-board memory within the microprocessor 52. It is noted that the controller can be configured to limit the cumulative data displayed to the preceding 48-hour period, rather for the entire 30-day period stored in the RF chip memory.

In a further aspect, the RF chip can store data regarding accumulated usage of the compression device. This data can be in the form of a cycle count indicative of the number of compression cycles the device has performed or in the form of accumulated pulse counts indicative of the rotational movement of the pulley, as described in more detail herein. The accumulated usage data can be compared to a threshold value in the controller 14 when the wrap 12 is paired with the controller. If the accumulated usage data stored in the RF chip 65 of the wrap exceeds the threshold, the controller can deny concordance between the wrap and controller and prevent the device form operating. This feature can ensure that the disposable wrap 12 is not used beyond its preferred useful life and that the wrap cannot be re-used after disposal.

Figure 7:
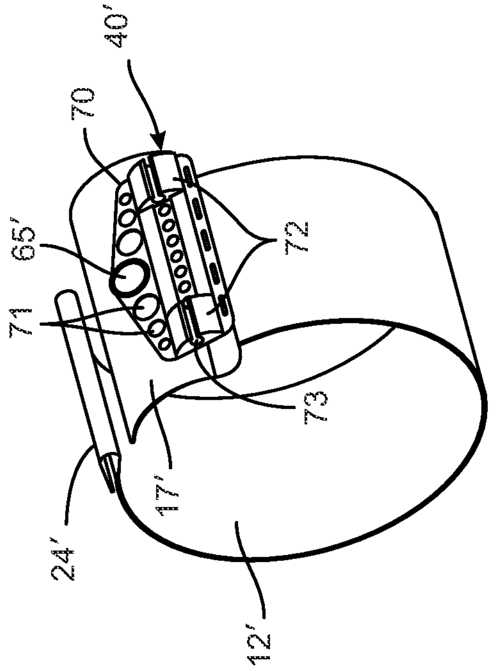
FIG. 7 is a perspective view of a disposable wrap of the compression device according to another embodiment of the present disclosure.
Figure 8A:
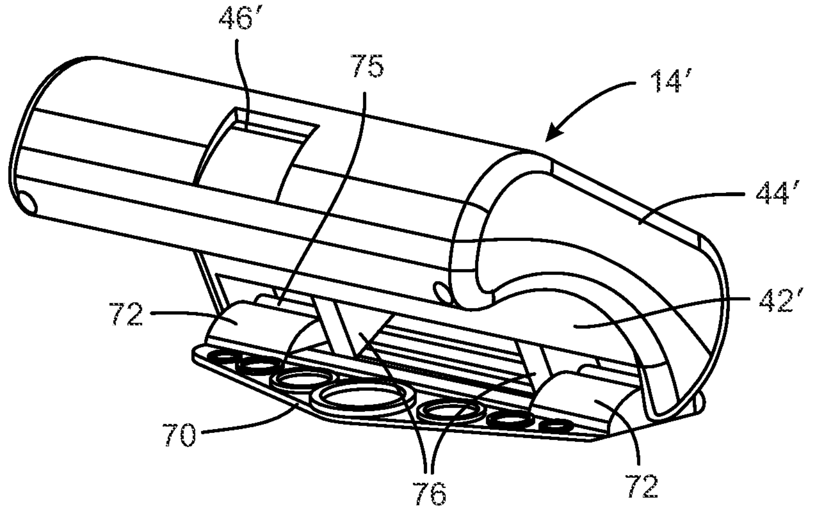
FIG. 8A is a perspective view of a controller for use with the disposable wrap shown in FIG. 7.
Figure 8B:
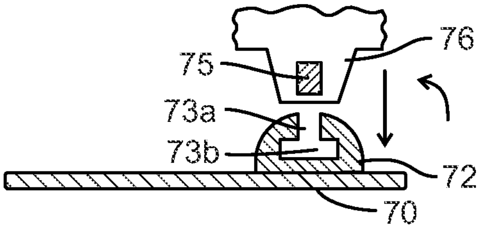
FIG. 8B is an enlarged partial cross-sectional view of the interface keyed hinge shown in FIG. 8A.

An alternative embodiment of the DVT cuff is shown in FIGS. 7, 8A and 8B. The modified cuff includes a modified wrap 12' (FIG. 7) that is configured similar to the wrap 12 for encircling a patient's limb, including the end loop 24' and the flap 17'. However, the mounting arrangement 40' for removable mounting the controller 14' is modified from the mounting arrangement 40. In this embodiment, the mounting arrangement 40' is a keyed hinge arrangement that includes a mounting pad 70 fastened to the wrap 12'. The pad 70 includes a pair of keyed bases 72 integral with or mounted to the pad. The keyed bases each define a keyed slot 73$a$ that opens into a rectangular channel 73$b$. The slot 73$a$ has a width that can accept a rectangular hinge beam 76 of the controller 14' when it is inserted with the narrow dimension facing the slot, as shown in FIGS. 8A-8B. When the beam 76 passes through the slot into the channel 73$b$, the beam can be rotated (counter-clockwise in the drawing) so that its wider dimension is aligned with the opening of the slot, thereby preventing the beam from being removed from the slot without rotating the beam in the opposite direction.

The hinge beam 76 is mounted between a pair of mounts 75 projecting from the base plate 42' of the controller 14'. The hinge beam 75 is configured as a rectangular beam, as described above, for introduction into and rotation within the keyed slot and channel 73*a*, 73*b*. The controller 14' can be otherwise configured like the controller 14, including the curved base plate 42' and the cover 44' defining a pull strap slot 46' through which the pull strap (not shown) extends. The drive mechanism and control circuitry 50 can be the same for the controller 14' as in the controller 14. However, in this embodiment, since the controller 14' is mounted to the wrap by way of the keyed hinge interface, the cuff 10' does not include the load cell feature of the cuff 10 that is configured to determine the load or force applied to the patient through the cuff. Instead, in this embodiment, the motor can include the current sensor discussed above that is used to determine the motor current during compression, to thereby determine the tension force in the wrap, which correlates to the compressive force applied to the patient's limb.

The wrap 12' includes an RF chip 65' similar to the RF chip 65 of the wrap 12. However, in this embodiment, the chip 65' can be mounted on or embedded in the mounting pad 70. The chip 65' is thus positioned, like the chip 65, to be detected by the RF circuitry 56 of the control circuitry.

The mounting pad 70 can incorporate ventilation openings 71. Similarly, the flap 17' may also incorporate ventilation openings or perforations, such as the openings 71. In this specific embodiment, the flap 17' is not formed of the same breathable material as the wrap 12', but is instead formed of a semi-rigid but pliable material, such as a low-density foam, in particular a PORON® foam. The flap formed of the low-density foam can have a basic shape that follows the curvature of the patient's limb, but is pliable enough to flex as needed to avoid exerting pressure on the skin. In this instance, the ventilation perforations 71 in the flap 17' are beneficial to provide air flow to the patient's skin in contact with the flap. Although the openings or perforations 71 are shown as circular, they could have other configurations, such as elongated slots through the pad 70 and flap 17'.

Figure 25:
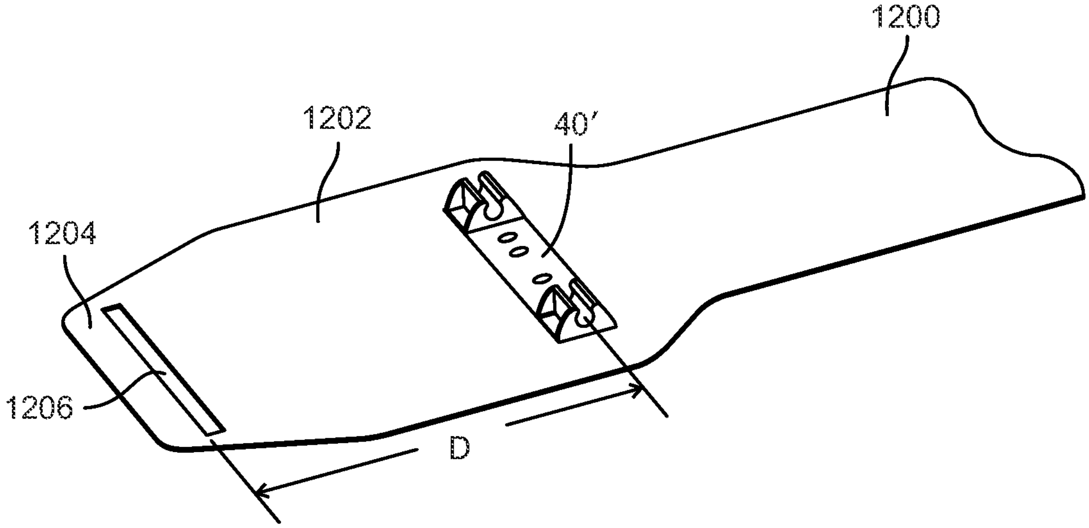
FIG. 25 is a perspective view of a disposable wrap according to a further embodiment of the present disclosure.
Figure 26:
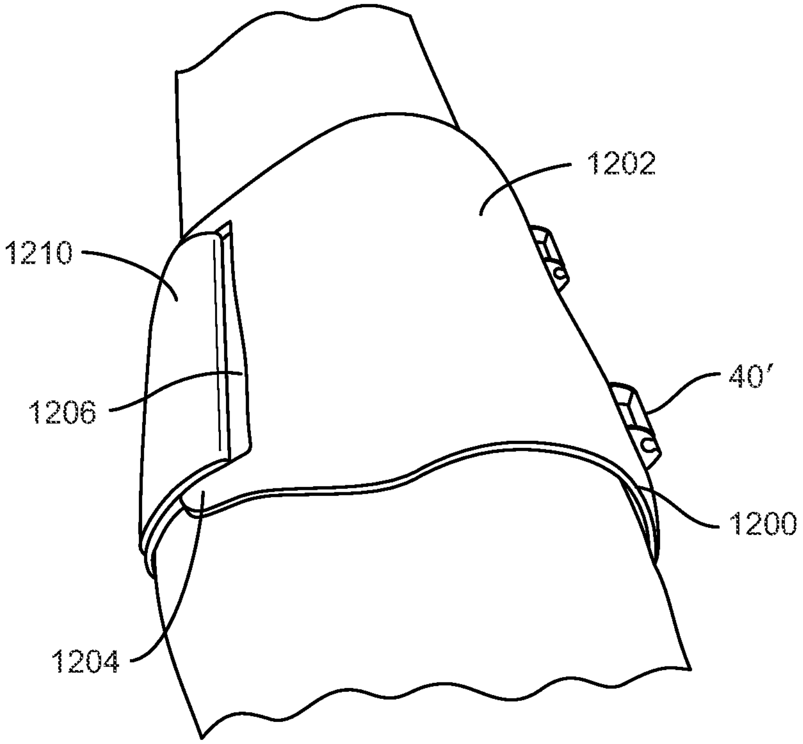
FIG. 26 is a view of the wrap of FIG. 25 engaged on the limb of a patient in a first temporary mounting configuration.
Figure 27:
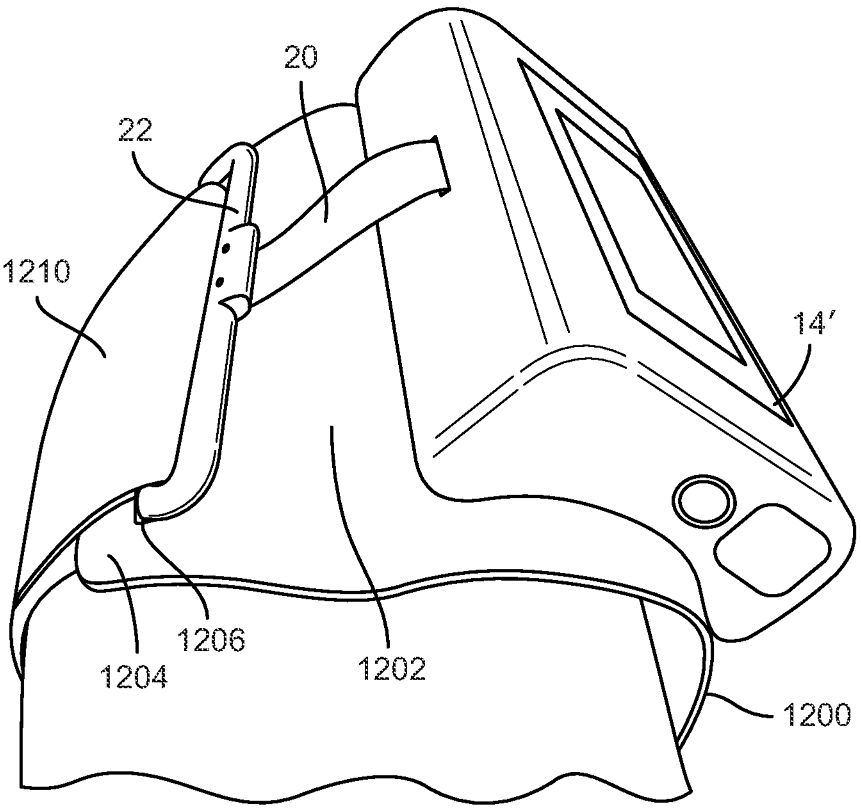
FIG. 27 is a view of the wrap of FIG. 26 engaged on the limb of a patient in a second mounting position with the controller of FIGS. 8A-8B mounted thereon.

The wrap 12' for the compression device 10 can be modified as shown in FIGS. 25-27 to facilitate positioning the device on the limb of a patient. As shown in FIG. 25, the wrap 1200 can replace the wrap 12', so the wrap 1200 can be formed of the same material and have the same overall length as the wrap 12' in order to encircle a portion of the patient's body, typically a limb. The wrap 1200 includes a portion 1202 that can correspond generally to the flap 17' of the wrap 12' in that a mounting arrangement 40' is mounted at one end of the portion 1202. Like the flap 17', the portion 1202 is also disposed between a controller 14' (FIG. 27) mounted on the mounting arrangement 40' and the skin of the patient. As shown in FIG. 25, the portion 1202 of the wrap 1200 terminates at end 1204 in a slot 1206 that is configured to receive the opposite end 1210 of the wrap in a loop as depicted in FIG. 26. The slot 1206 thus allows the wrap 1200 to be temporarily mounted on the patient's limb, such as the leg depicted in FIG. 26, before the controller is attached to the wrap. This feature facilitates initial placement of the compression device 10 on the patient since the wrap 1200 and mounting arrangement 40' can be optimally positioned on the patient's limb prior to engagement of the controller. This feature also facilitates removal and replacement of the controller while the wrap is still engaged on the patient, without the necessity of removing the entire device, wrap and all, from the patient.

As shown in FIG. 27, the controller 14' can be mounted on the wrap by engaging the mounting arrangement 40' as described above. The controller is engaged to the mounting arrangement and pivoted toward the portion 1202 with the pull strap 20 fully extended, as shown in FIG. 27. In this configuration, the D-ring 22 is positioned directly above the slot 1206 where the end 1210 of the wrap is looped around. The loop can be detached and the end 1210 fed through the D-ring 22, while still extending through the slot 1206. With the end 1210 passing through the slot the wrap holds its position on the limb of the patient as the end is fed through and looped around the D-ring. The end 1210 can be tightened as needed to provide the initial mounting tension for the wrap 1200, as described above.

The strap 1200, and particularly the portion 1202, is configured to provide a predetermined distance D between the mounting arrangement 40' and the slot 1206, as shown in FIG. 25. This distance corresponds to the extended length of the pull strap 20 relative to the controller 14' that allows the D-ring 22 to be aligned with the slot 1206 as shown in FIG. 27. In one specific embodiment, this distance D is 4.91 inches, while the distance from the mounting arrangement 40' to the edge of the wrap at end 1204 is 5.75 inches. This dimension not only allows proper orientation o the D-ring relative to the slot, it also avoids the problem of bunching of the portion 1202 as the pull strap 20 is retracted during a compression cycle. The portion 1202 of the wrap is engaged to the pull strap 20 by the loop of the end 1210 passing through both the D-ring 22 and the slot 1206. Thus, as the pull strap is retracted it pulls the end loop 1210, thereby reducing the effective diameter of the wrap 1200 and introducing compression. The retraction of the pull strap also pulls the end 1204 of the portion 1202 toward the controller 14'. If the portion is too short, the portion will try to bunch underneath the controller, thereby disrupting the compression applied to the patient. In the illustrated embodiment, the distance D is such that the portion 1202 bunches outside the controller in a manner that does not alter or disrupt the compression force applied to the patient.

In both embodiments of the DVT cuff shown in FIGS. 1-8 and FIGS. 25-27, the cuffs 12, 12', 1200 and controller 14, 14' are separate and separable units. The cuff 12 includes the clips 60 that can readily receive the load cell axle 60 to mount the controller 14 on the cuff. The cuffs 12' and 1200 include the keyed base 72 that allows the controller 14' to be quickly mounted onto the cuff 12'. Each cuff 12, 12', 1200 is configured to be patient-specific and disposable. The RF chip 65, 65' for each cuff is provided with a unique identifier or serial number stored on the chip and readable by the RF circuit 56 of every controller, which identifier can be associated with a particular patient. As explained above, the microprocessor 52 includes software that reads the identifier of the chip and authenticates the chip, and therefore the wrap, as an authorized unit. Moreover, in a patient setting, the unique identifier also becomes a unique identifier of the patient. Regardless of what controller reads the data on the RF chip, that data is always associated with the unique chip identifier and therefore always associated with the particular patient to whom the cuff 12, 12', 1200 was issued.

The controller is not intended to be disposable, but is instead reusable with every authenticated and authorized cuff. Since the controller is not specific to any particular cuff it is capable of being used with a number of cuffs, which is particularly useful in a hospital setting. Since the DVT cuff is not continuously worn and used by a patient, a single controller can be used to control the compression protocol for a number of patients, with each patient being uniquely identified by the cuff 12, 12', 1200 issued to that patient. The cuff remains with the patient at all times, but the controller can be maintained in a separate storage unit. In a hospital, each ward or unit of the hospital can have its own collection of controllers, all capable of being used interchangeably with all patient-specific cuffs in every ward or unit of the hospital. Thus, a patient undergoing surgery may wear a DVT cuff that is operating during the surgery to prevent the onset of DVT condition. When the surgery is complete, the controller is removed and kept with the surgical unit, and the patient is transferred to a recovery ward or ICU where a controller maintained by that ward or unit can be engaged to the patient's cuff to continue DVT preventative treatment during recovery. If the patient is moved to a longer-term care room, the recovery ward controller is removed and the controller maintained by the care ward is engaged to the patient's cuff. When the patient is released but DVT treatment is still prescribed, the patent can take his/her assigned cuff 12, 12', 1200 home together with a separately prescribed controller for home use. Once the treatment is complete or the risk of DVT has passed, the patient can dispose of the cuff and return the controller 14, 14' to the medical facility.

Figure 9:
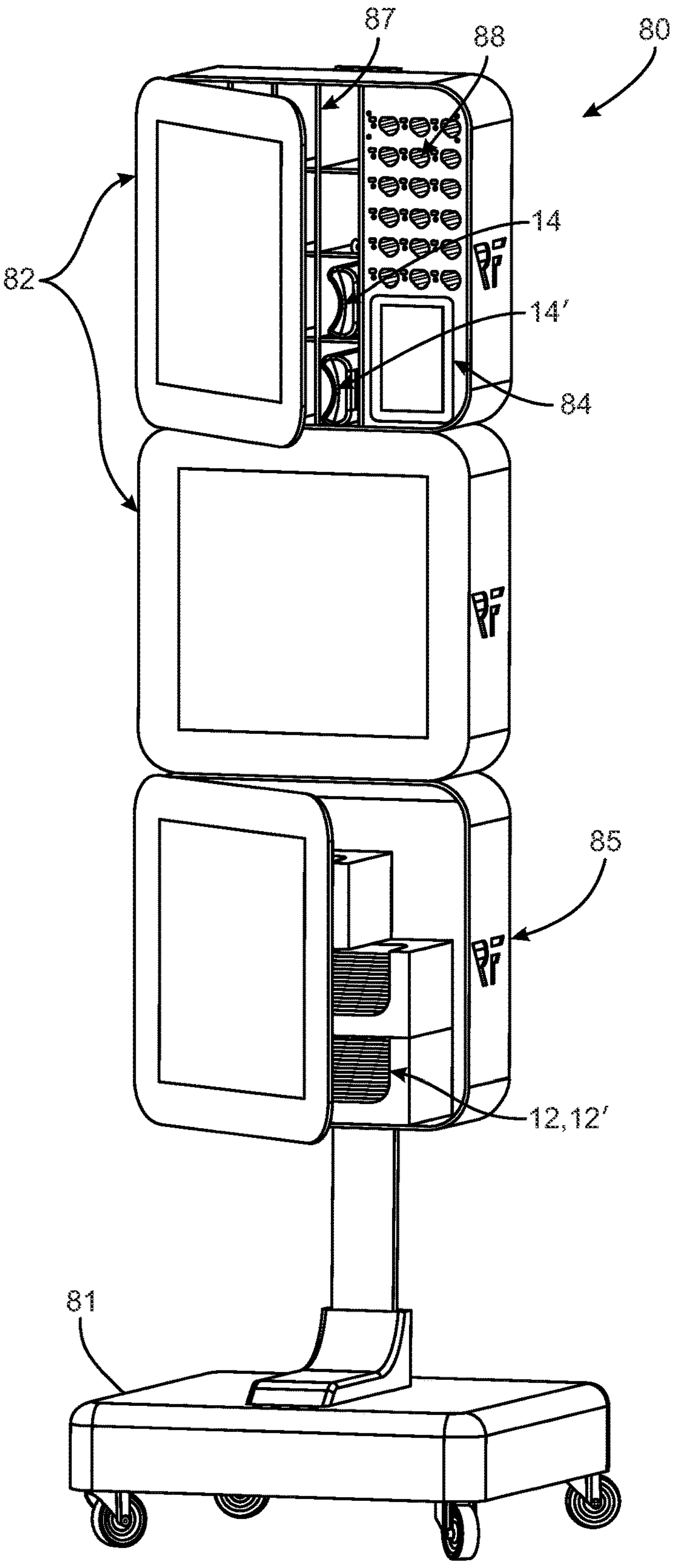
FIG. 9 a front view of a kiosk for storage and maintenance of the compression devices shown in FIGS. 1-7.

In one feature of the present disclosure, a kiosk 80 can be provided that includes a number of bays 82 for storing several controllers 14, 14', as shown in FIG. 9. Each bay can include a charging station for charging the battery of each controller. Each bay may also include a data cable for connecting to a data jack of the controller, to permit uploading and downloading of data, information, application software, updates, upgrades and the like. The digital processor, or microprocessor, of each controller includes software and/or firmware for handling this data transmission. The control circuitry 50 may also include a wireless transmitter/receiver, such as a WiFi enabled antenna, to permit remote transmission and reception of data, with the kiosk similarly configured for wireless communication. The controller storage bays 82 of the kiosk 80 can be provided with a digital processor 84 that controls the communication with each of the controllers stored therein. The processor may be capable of wired or wireless communication with the processor of each controller, such as with WiFi or Bluetooth transmission protocols. Each controller or microprocessor 52 may be uniquely identifiable, such as by a unique stored address, to facilitate communication between the kiosk processor 84 and the microprocessor 52. The kiosk processor can include software for manipulating and/or analyzing the data downloaded from the controllers, as well as a user interface (not shown) that provides access to this information by medical personnel. It is contemplated that each unit or ward of a hospital, for instance, will have one or more kiosks 80 to house and maintain multiple controllers 14, 14' for use by patients in that hospital unit. To facilitate usage, the kiosk may be carried on a mobile base 81.

The kiosk can also include a module 88 for use in charging the replaceable batteries. Another module 87 can incorporate disinfection equipment, such as a UV-C lamp, that can aid in the disinfection of a controller after each use. The kiosk may also include a number of bays 85 for storing new wraps 12, 12' for initial distribution to a patient.

Figure 10A:
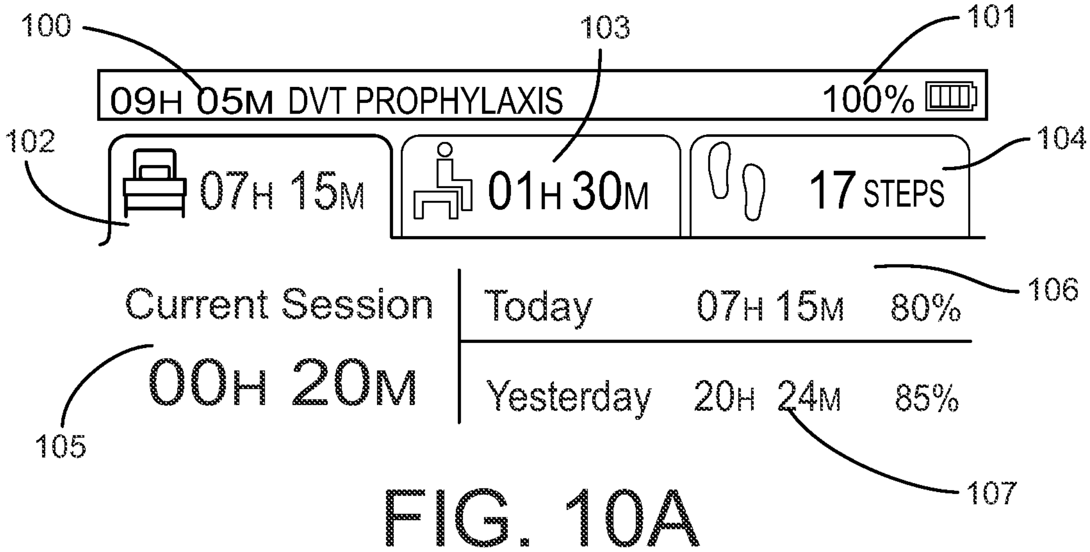
FIGS. 10A-10C are screen shots of a display provided by the compression device of FIGS. 1-7.
Figure 10B:
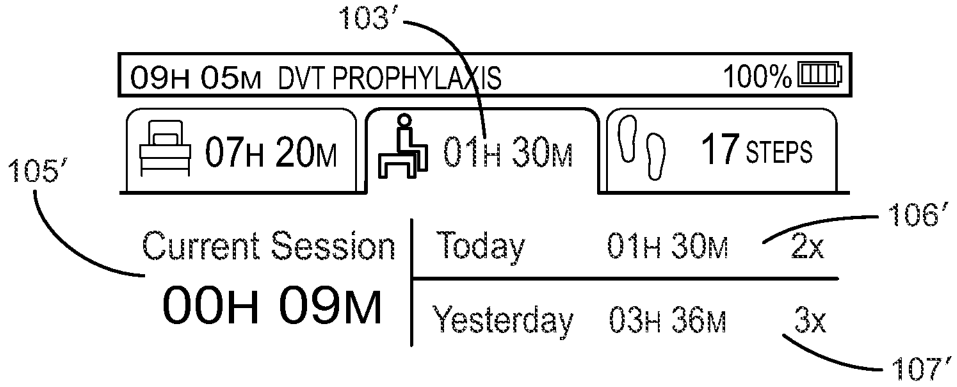
Figure 10C:
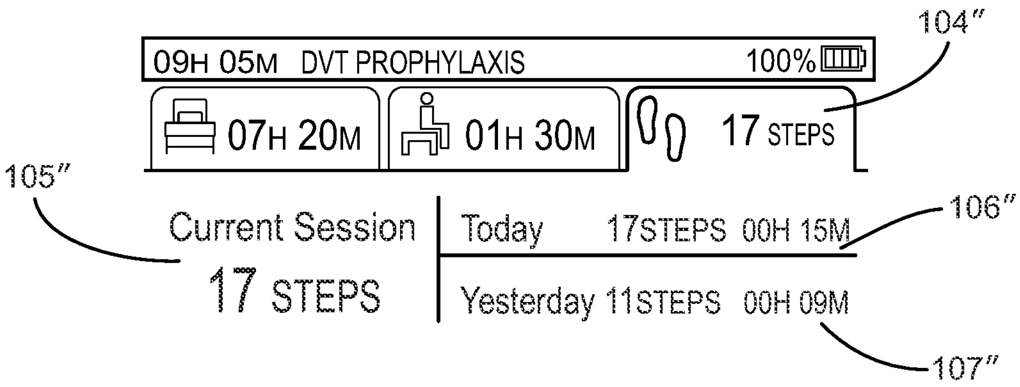

Returning to the controller 14, 14' associated with a wrap 12, 12', 1200, the microprocessor 52 can execute software or firmware that monitors various attributes of the DVT cuff and the patient and then displays pertinent information on the display 15. An exemplary data display is shown in FIGS. 10A-10C. The display includes a header band that describes the treatment, in this case "DVT Prophylaxis", and provides the current time in box 100 and the battery status in box 101. The next row of the display includes three boxes indicative of the activity of the patient, with the box 102 corresponding to "in-bed" time, box 103 corresponding to "sit-stand" time and the last box 104 corresponding to "step" time. The accelerometer 55 incorporated into the controller 14, 14' and the microprocessor 52 are configured to ascertain the physical position of the patient (i.e., supine, seated or standing) as well as the activity (i.e., walking) of the patient. It is noted that a gyroscope may be included with the accelerometer to enhance the patient position and motion detection capabilities. The microprocessor 52 is configured to evaluate all of the sensor data and accumulate the activity information displayed on the device. It is noted that this same information is communicated to and stored in the RF chip 56 associated with the wrap 12 as the data is generated. This data maintained by the RF chip can be uploaded later by a different controller or by a different digital processor.

As reflected in FIG. 10C, the first activity box 102, the "in-bed" time box, is highlighted indicating that the information in the next row of the display relates to that activity of the patient. The other two boxes 103, 104 can be highlighted by using the touch screen feature of the display 15, in which case the next row will display information related to the "sit-stand" or "step" activities. In the display shown in FIG. 10A, the medical personnel has selected the "in-bed" information, so the third row of the display identifies the amount of time in box 105 that the patient has been involved in this current "activity"—i.e., how long the patient has been supine or reclined in bed. Box 106 displays the total amount of time for the current day that the patient has been in the "in-bed" activity. This information is also displayed in box 102 in the second row of the display even when the "in-bed" activity has not been selected. The last box 107 displays the amount of time for the "in-bed" activity for the prior day.

FIG. 10B shows the display when the "sit-stand" box 103 has been selected by the medical personnel. The third row boxes 105', 106' and 107' display the current session time, current day accumulated time and prior day accumulated time in the "sit-stand" activity. For this activity, the accelerometer 55 data indicates that the patient is no longer inclined or supine. It can be noted that since the DVT cuff is on the patient's leg, the lower leg will be substantially vertical during the "sit-stand" activity, but substantially horizontal during the "in-bed" activity. The microprocessor 52 is able to distinguish the accelerometer data to accurately determine the patient's physical position. The total time for the day displayed in box 106' is also displayed in the activity selection box 103.

FIG. 10C shows the display when the third "step" activity has been selected in box 104. Again, the third row displays 105", 106" and 107" provide an indication of the level of "step" activity. However, rather than displaying time data, the displays show the number of walking steps taken by the patient as determined by the accelerometer data. The total steps for the day displayed in box 106" is also displayed in the activity selection box 104. It can thus be appreciated that the medical personnel can determine the patient's compliance to the DVT prophylaxis treatment at a glance by looking at the second row display boxes 102, 103, 104. It can be appreciated that rather than the number of walking steps, the microprocessor can determine the amount of time spent walking, so that the data in box 106" would be time data.

All of this information gives the medical personnel or care-giver a complete picture of the patient's compliance with the compression protocol and mobility regimen. "Early Mobility" or "Progressive Mobility" programs have been found to lower the incidence of hospital-acquired or recovery-acquired events, including not only DVT but also pressure ulcers and infections. Mobility protocols have also been linked to reductions in length of stay at the hospital, re-admission rates and overall costs of stay. The ready availability of patient compliance and activity information can allow the medical personnel to address deviations from the recommended prophylactic protocol.

Figure 10D:
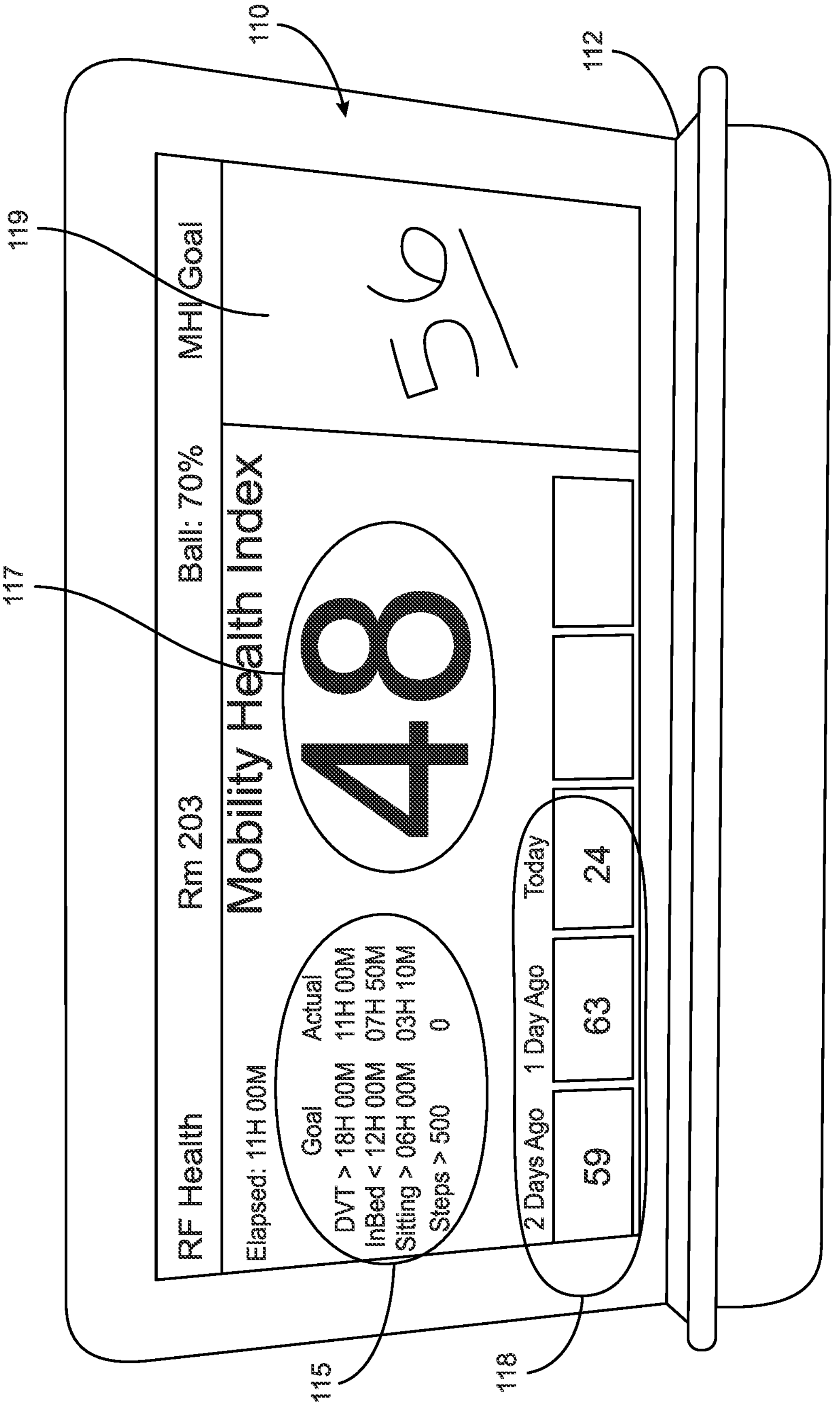
FIG. 10D is a display device that displays a summary of the information displayed by the compression device.

In one embodiment the patient compliance information is displayed on the controller, as described above. In another embodiment, the patient compliance information is transmitted from the controller to a separate display associated with the patient's hospital room. However, rather than sequence through the different screens shown in FIGS. 10A-10C, the room display summarizes the compliance data to provide the medical personnel or care-giver a quick indication of the patient's status. The summary includes the total DVT prophylaxis time, the total in-bed time, the total sitting time and the total number of steps taken over a pre-determined elapsed time. In accordance with one aspect of the present disclosure, a display device 110 can be provided as shown in FIG. 10D. The device 110 includes a housing 112 that can be mounted on a wall or free-standing. The device can be battery powered or can be tied to a separate power source. The device includes a digital processor, such as a microprocessor, that can communicate wirelessly with the cuff 12, 12', 1200 worn by a person in a healthcare facility. The cuff worn by the user thus includes a wireless communication feature, such as Bluetooth, capable of transmitting data from the cuff to the display device 110. The data transmitted from the cuff 12, 12', 1200 worn by the patient to the device 110 can be the same information displayed on the patient cuff shown in FIGS. 10A-10C. That information can be displayed on the device 110 in a display field 115. In addition to the accumulated times (prophylaxis, in-bed, etc.), the display field 115 can display a goal for the patient. Thus, as shown in FIG. 10D, the patient has a goal for total DVT prophylaxis time of 18 hours. The total prophylaxis time to date is displayed adjacent the goal, in this case 10 hours, so medical personnel can have an immediate impression of how the patient is progressing. The physician can establish goals for DVT prophylaxis time, in-bed time, sitting time and steps for the patient to be released from care, for instance. The display field 115 can serve as a motivator for the patient as he/she sees his/her progress toward the goals. The display field can also provide a quick reference to the physician to determine whether the patient requires more interaction and prompting to meet the stated goals.

In another feature, the compression therapy system of the present disclosure utilizes a Mobility Health Index (MHI) to provide a single number indicative of patient compliance and progress. The MHI is based on all of the total information listed above, with different weights assigned to each type of data. The weights are established according to a desired focus from among the four types of data (DVT time, in-bed time, sitting time and amount of walking). For instance, in one example, DVT prophylaxis time can be weighted more heavily than the other three data types while the other three data types can be equally weighted. Thus, in this example, the DVT prophylaxis time can be given a weight of 0.40 and the in-bed time, sitting time and number of steps can each be given a weight of 0.20. The physician can adjust the weights to fit the desired recovery protocol for the patient. For instance, a lower weight can be applied to the number of steps for a patient that is not otherwise very mobile, or a lower weight can be applied to in-bet time if the physician wants to encourage the patient to get out of bed.

For a patient, goals can be established for each of the data types. For instance, a goal for DVT prophylaxis time for the patient may be 18 hours, in-bed time 12 hours, sitting time 6 hours and number of steps 100. A ratio of the actual time spent in each of the activities to the goal for that activity is multiplied by the weight for the particular activity to determine the contribution of that particular activity to the patient's overall MHI. In other words, the following calculations are made:

DVT contribution=DVT prophylaxis time*(DVT weight±DVT goal)

In-bed contribution=In-bed time*(In-bed weight±In-bed goal) if actual in-bed time≤goal, otherwise (In-bed goal−In-bed time)*(In-bed weight±(DVT goal−In-bed goal))

Sitting contribution=Sitting time*(Sitting weight±Sitting goal)

Steps contribution=Number of steps*(Steps weight±Steps goal)

MHI=DVT contribution+In-bed contribution+Sitting contribution+Steps contribution.

The table below represents a specific example of the MHI calculation according to the present disclosure that is shown in the display of FIG. 10D:

| | Weight | Goal | Actual | Contribution |
|---|---|---|---|---|
| DVT | 0.40 | 18.00 | 11:00 | 24% |
| In-Bed | 0.20 | 12.00 | 7:50 | 13% |
| Sitting | 0.20 | 6.00 | 3:10 | 11% |
| Steps | 0.20 | 500 | 0 | 0% |
| MHI | | | | 48% |

In accordance with this embodiment, the separate in-room display device displays the MHI number, in this case 48, very prominently in display field 117 so that the attending medical personnel can have an immediate direct indication of how the patient is recovering. An MHI of 100% means that the patient has met all of the prescribed mobility goals. A number significantly less than 100% can indicate that the patient is not following the DVT treatment regimen, which can inspire intervention from the medical personnel to motivate and monitor the patient to improve compliance. To further assist medical personnel, and even the patient, to follow the patient's recovery progress, the display device 110 can include a display field 118 with a three-day history of the calculated MHI. The device can also include a white board field 119 where the medical personnel or physician can write an MHI goal for the day—56 in the example in FIG. 10D. The physician can set the goal based on his/her assessment of the patient's capability and the ability of the goal to motivate the patient to be diligent with the recovery steps. The white board field 119 can be a white board or other similar physical surface on which the medical personnel can write the goal with an appropriate pen, or can be a touch screen or similar electronic device on which the medical personnel can produce an image by moving a stylus of finger across the field.

The collection of data for the MHI calculation and the calculations themselves can be performed by the controller or processor of the compression device and then transmitted wirelessly to the device 110 configured as a room-mounted display. Alternatively, the room-mounted display can include its own processor capable of receiving activity data transmitted by the compression device controller and then performing the MHI calculations. As a further alternative or adjunct, the room-specific information can be displayed at a common station, in which case the display would include information identifying the particular patient.

The DVT cuff can be placed on the patient's limb, such as his/her leg, as described above. The end loop 24 can be used to slightly tighten the wrap 12, 12', 1200 around the leg, with sufficient tightness to hold the cuff in place. A power switch (not shown) on the controller 14, 14' is actuated to activate the microprocessor 52 and initiate a start-up screen on the display 15. The microprocessor first checks the pulley sensor 54 to determine whether the pulley 34 is in its proper initial or "home" position. If not then the microprocessor will direct the motor controller 53 to operate the motor 32 in an "unwind" direction, such as counter-clockwise. The motor remains energized until the pulley sensor 54 detects the pulley at its home position.

Once the pulley is homed, the microprocessor prompts the operator with a display of a "Pretension" button on the touch screen display. When the operator presses the "Pretension" the microprocessor sends a command to the motor controller to set the motor rotational direction to the "wind" direction, namely clockwise in the present example. The microprocessor then sends a second command to the motor controller to energize the motor and set the motor speed to a pre-determined speed, preferably a mid-range rotational speed for the motor. As the motor operates the transmission 33 reduces the motor rotational speed to a suitable mid-range speed for the pulley, such as 10-15 rpm. As the pulley retracts the wrap, the microprocessor monitors the force applied to the wrap via the load cell 57. Alternatively, or in addition, the microprocessor can monitor motor current, as discussed above, which varies as a function of the load applied to the wrap (or more precisely the reaction load experienced by the controller). When a minimum pre-tension force is achieved, approximately 1 pound in a specific example, the microprocessor directs the motor controller to stop the motor and hold the pulley at its current location. The wrap is thus pre-tensioned at a known amount of compression on the patient's leg. In one embodiment, a new home position of the pulley can be set corresponding to the position of the pulley in the pre-tensioned state of the wrap.

With the wrap and controller properly installed and the desired pre-tensioning achieved, the microprocessor issues a notification on the display 15 that the compression protocol will begin. In one exemplary embodiment of the compression cuff 10, the compression protocol can be for DVT prevention. However, it is understood that other compression protocols are contemplated and can be readily executed with the present cuff. The series of instructions from the microprocessor 52 to the motor controller 53 are generated by software/firmware executed by the microprocessor. This software can be configured as a generic series of commands that read compression variables from a stored database, such variables including on-off times, dwell times, power levels and the like. This database can be contained within the memory of the microprocessor or downloaded from a remotely stored database. As a further alternative, the software itself can be application specific with all of the protocol-specific variables hard-wired into the software commands. It is thus contemplated that the database of variable and/or protocol specific software can be patient-specific and incorporated into each controller 14 being used by the particular patient. In this respect, the variables database can be stored in the RF chip 65, 65' associated with the patient's cuff, and then uploaded into each controller 14 connected to the patient's cuff.

Returning to the operation of the drive system for the cuff 10, when the compression protocol begins, the microprocessor sends a command to the DC motor controller circuit to set the motor direction to clockwise and to set the power value for the motor to full power. In one embodiment, the motor controller is a pulse-width modulated controller, in which case the full power mode corresponds to a PWM input of 254 for a 100% duty. In one specific embodiment, in the full power mode of the motor, the pulley rotates at approximately 30 revolutions per minute (rpm) with a torque of 310-inch ounces. During compression, the microprocessor continuously monitors the force of the compression wrap via the load cell 57 (the DC motor current). When the force being applied to the wrap equals the pretension force plus a pre-determined offset force, such as about 7 lb. in one example, the microprocessor sends a "stop" command to the DC motor controller which de-energizes the DC motor. The microprocessor holds the position of the pulley for 500 milliseconds. After the "hold", the microprocessor sends a set counter-clockwise motor direction command to the DC motor controller and sets the motor power to "low" speed, which can correspond to a PWM input of 60 for a 25% duty cycle. As the motor turns counter-clockwise, to release the pull strap 20 and relieve the wrap compression, towards the home position, the microprocessor monitors the force until the pretension force is met, after which the microprocessor sends a stop command to the DC motor controller. In an alternative embodiment in which a new home position of the pulley is reset corresponding to the pre-tensioning position of the pulley, the microprocessor can monitor the pulley sensor and send a stop command when the pulley reaches the updated home position. After the stop command is executed, the microprocessor updates the compression duration time and resets the cycle timer to zero. When the cycle timer reaches a pre-determined dwell time, such as 60 seconds, the compression process is re-played.

As described above, the compression achieved by the DVT cuff is effectuated by a small DC motor 32 within the controller 14. The cuff 12, 12' is fastened at one end to the housing of the controller, either directly or via a load cell 57 as described above. The opposite end of the cuff, the end loop 24, is connected to the D-ring 22 at the end of the pull strap 20. The pull strap is fastened to the rotating pulley 34 so that rotation in one direction, such as clockwise, causes the pull strap to wind around the pulley. As the strap winds it pulls the D-ring, which pulls the wrap 12, essentially shortening the effective length of the wrap and tightening it around the patient's limb/leg.

As mentioned above, the microprocessor 52 of the controller 14, 14' can be programmed to many different compression protocols. In the exemplary embodiment, the cuff 10 serves as a DVT cuff for the prevention of deep vein thrombosis in a patient's limb, particularly the leg. In order to prevent DVT the goal is to push the blood up the femoral vein toward the heart. However, simply exerting pressure on the lower leg and pushing blood toward the heart has not been found to eliminate the risk of DVT. Instead, achieving a particular flow velocity through the femoral vein is essential to good DVT prophylaxis. In particular, a flow velocity that is about three times the baseline flow velocity through the femoral vein for the patient has been found to be effective in preventing DVT.

Figure 11A:
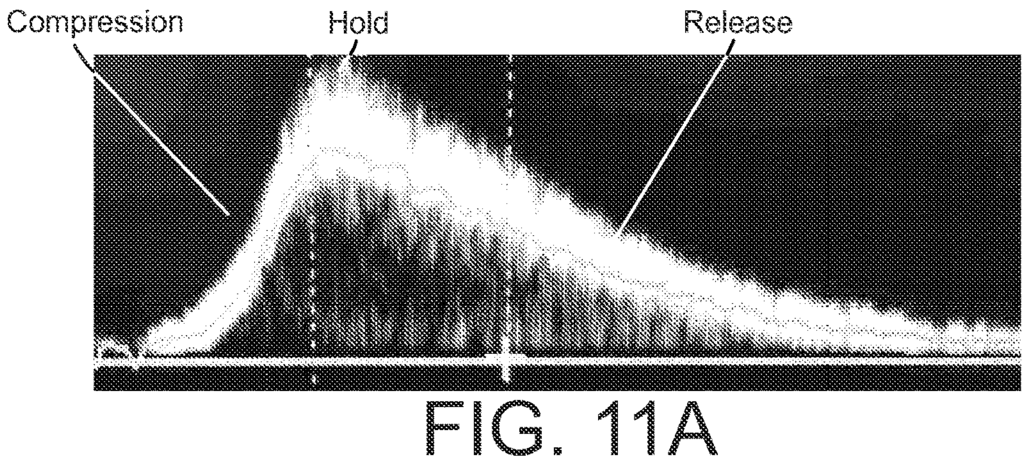
FIG. 11A is a graph showing blood flow velocity at the femoral vein during a compression cycle using the compression device shown in FIGS. 1-7 as a DVT prophylaxis.
Figure 11B:
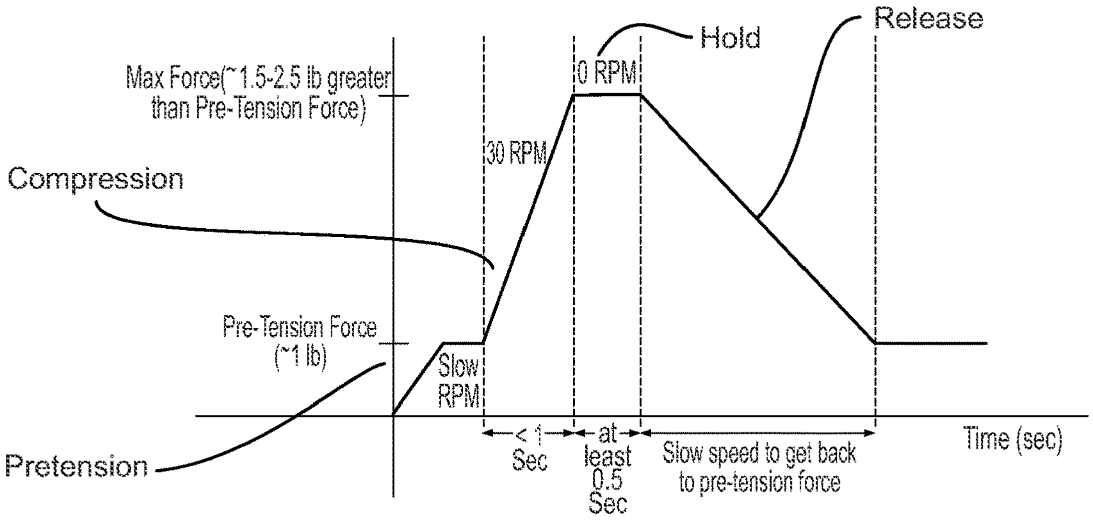
FIG. 11B is a graph of an ideal force profile for generating the blood flow velocity profile shown in FIG. 11A.

In one aspect of the present disclosure, an optimum compression protocol for DVT prevention has been developed for implementation in the non-hydraulic compression cuff disclosed herein. The graph shown in FIG. 11A is a Doppler image of the blood flow velocity through the femoral vein of a patient wearing the DVT cuff 10 of the present disclosure. The graph in FIG. 11B shows the compression profile applied by the controller 14, 14' through the wrap 12, 12' that achieved the blood flow profile shown in FIG. 11A, in which the graph shows the tension applied in the wrap which translates to a compressive force applied to the patient's limb. As shown in the graph of FIG. 11B, the compression protocol includes four segments—one pretensioning segment and three compression segments—that occur over the span of less than about 6 seconds. The pretensioning stage establishes the baseline pressure on the limb that holds the DVT cuff on the patient's limb without exerting significant pressure. In one embodiment, that pretension force (again, the tension force in the wrap) is less than 1 lbf. As described above, during pre-tensioning the DVT cuff is activated for less than 1 second at a relatively slow rate (10-15 rpm pulley speed) so that no appreciable upward blood flow is produced, as reflected in the Doppler image in FIG. 11A. Although the compression segments immediately follow the pre-tension segment in the graph of FIG. 11B, there may be some delay once the pre-tension force is established. However, it is preferred that the compression cycle commence immediately after the appropriate pre-tensioning force has been achieved.

In the second stage, or the first stage of the repeated compression protocol, the motor is driven at its maximum speed for less than one second until a predetermined maximum tension force in the wrap is reached. In one embodiment, this maximum force can range from 5.5-6.5 lbf greater the pre-tension force, corresponding to a maximum tension force in the wrap of between about 6.5 lbf to about 7.5 lbf (for a 1.0 lbf pre-tension). It has been found that the requisite upward blood flow of three times the normal flow femoral vein flow rate or velocity is achieved not only by the amount of compressive force applied to the limb by the tensioning of the wrap, but also by the rapidity of the application of that compressive force. Thus, in the exemplary embodiment, the DVT cuff achieves the maximum applied force in less than about one second. This pressure is maintained for the hold segment shown in FIG. 11B, which in the illustrated embodiment is preferably about 0.5 seconds. This hold time is important to avoid an abrupt collapse of the compression profile due to the elasticity of the femoral vein and hydraulic pressure within the circulatory system.

The fourth segment, or third segment of the compression cycle, relieves the tension force in the wrap, and thus the compression force on the patient's limb, but does so gradually to allow the blood flow velocity to return to the normal baseline velocity for the patient. Thus, the motor is reversed and driven at about one-fourth of the motor speed during the third segment of the repeated compression cycle. In the illustrated embodiment, the motor is driven at about a 25% duty cycle over a period of about three seconds. At the end of the release segment, the DVT cuff is returned to its pretensioning state (1.0 lbf in the embodiment) and the motor is de-activated for a predetermined dwell time before another compression, hold, and release cycle is commenced. As described above, this dwell time can be about 60 seconds. The controller 14, 14' repeats these three segments for a prescribed treatment period, which can range from 15 minutes to an hour, or from 15-60 compression cycles, depending on the patient needs. With each compression cycle (compression, hold and release) the blood velocity follows the profile shown in FIG. 11A for optimum DVT prevention.

Once the treatment time has been reached, the controller can continue the last release stage until all compression force, including the pre-tension force, is removed. Alternatively, the DVT cuff can be removed once the force has dropped to the pretension force by simply unwrapping the end loop 24 from the D-ring 22 of the controller.

Figure 11C:
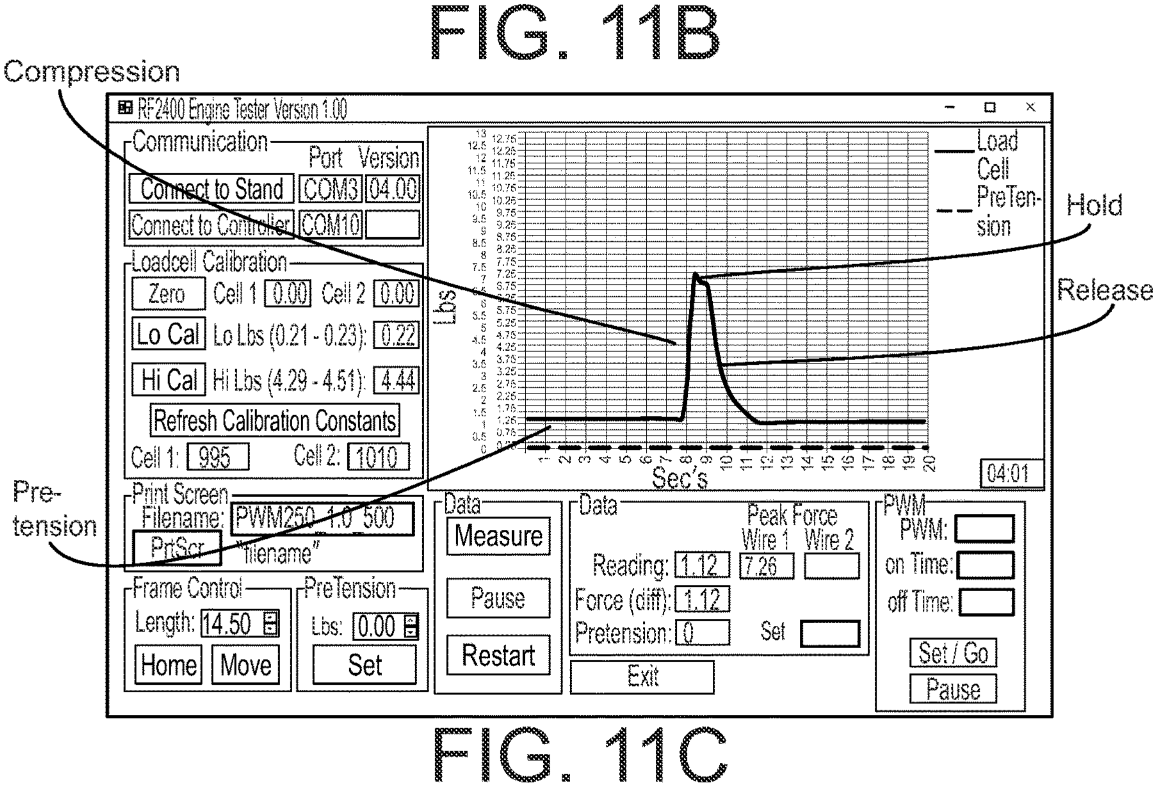
FIG. 11C is a graph of an actual force profile of a compression device shown in FIGS. 1-7 generating the blood flow velocity profile shown in FIG. 11A.
Figure 12:
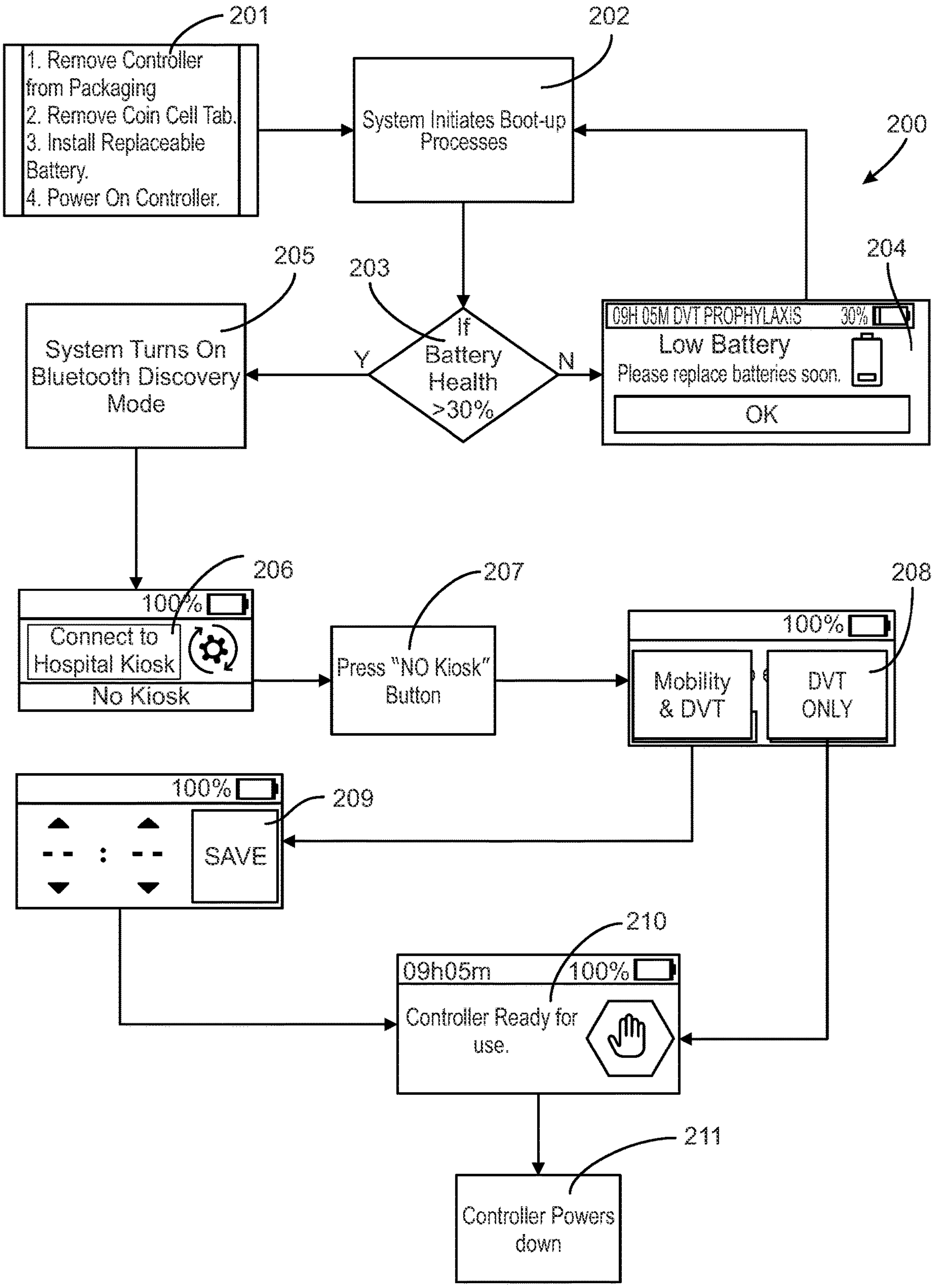
FIG. 12 is a flowchart of steps for initializing a controller for a compression device disclosed herein.

It is noted that the graph on FIG. 11B is an idealized force profile to produce the desired blood flow velocity. The graph in FIG. 11C is a force profile of an actual actuation of the DVT cuff 10 on a patient's leg that produced the flow velocity graph in FIG. 11A. It can be appreciated that during the hold segment of the force profile the compression force declined slightly from the hold value in the idealized graph of FIG. 11B. It is believed that this slight reduction is due to elastic reactions of the body tissue to the rapid compression. Nevertheless, even with this slight deviation from the maximum compression force, the blood velocity still follows the preferred profile of FIG. 11A to prevent the onset of a DVT condition.

As described above, the DVT cuff 10, 10' includes a removable and replaceable controller 14, 14' that includes control circuitry 50 for controlling the operation of the cuff, namely the pre-tensioning and compression stages as well as data collection and retrieval. The control circuitry 50 includes a microprocessor 52 and associated digital memory that includes software and/or firmware that controls the operation of the cuff. FIGS. 12-19 show flowcharts for various functions performed by the DVT cuff 10, 10' and the kiosk 80. It is contemplated that the DVT cuff of the present disclosure can be used as a "stand-alone" device, such as for individual patient home care, rather than associated with a kiosk, as might occur in a hospital setting. Thus, the steps for initializing a controller for a stand-alone DVT cuff (i.e., not associated with a kiosk) are shown in the flowchart 200 of FIG. 12. The controller can be provided pre-packaged with a replaceable battery isolated by a tab. In the first step 201, this tab is removed and the controller is powered on. In the next step 202 the microprocessor automatically initiates boot-up process in which the various electrical components and sensors are activated and verified. A battery check is performed in step 203 with a "low battery" display provided on the controller screen 15 in step 204. If the battery has sufficient power the controller activates the wireless communication components that allow the controller to communicate with a kiosk in step 205. A "connect to kiosk" display is generated in step 206 with a button "No Kiosk" that can be pressed on the touch screen display 15 in step 207 to indicate that this controller is not operating in connection with a kiosk. It is noted that in the present embodiment, the controller 14, 14' is configured for kiosk or non-kiosk operation, hence the steps 206, 207. However, in an alternative embodiment the wireless kiosk communication feature can be eliminated for DVT cuffs intended for use outside a hospital setting. The wireless communications feature may still be activated in step 205 for communication with a different device, such as a Bluetooth enabled smart phone or similar device.

In the next step 208 a display is provided that allows the operator to select from the two operational modes of the DVT cuff—mobility and DVT prophylaxis, or DVT prophylaxis only. In both modes the DVT compression protocol is enabled, but in the first mode the patient is expected to move apart from the hospital bed. The selection of the mode depends on the patient treatment protocol. If "mobility & DVT" is selected the controller sends the display to the screen in step 209 that allows the operator to enter an elapsed time for use of the DVT cuff in the mobility mode.

Once the mode has been selected the controller displays that the controller is ready for use in step 210 after which the controller powers down in step 211.

Figure 13:
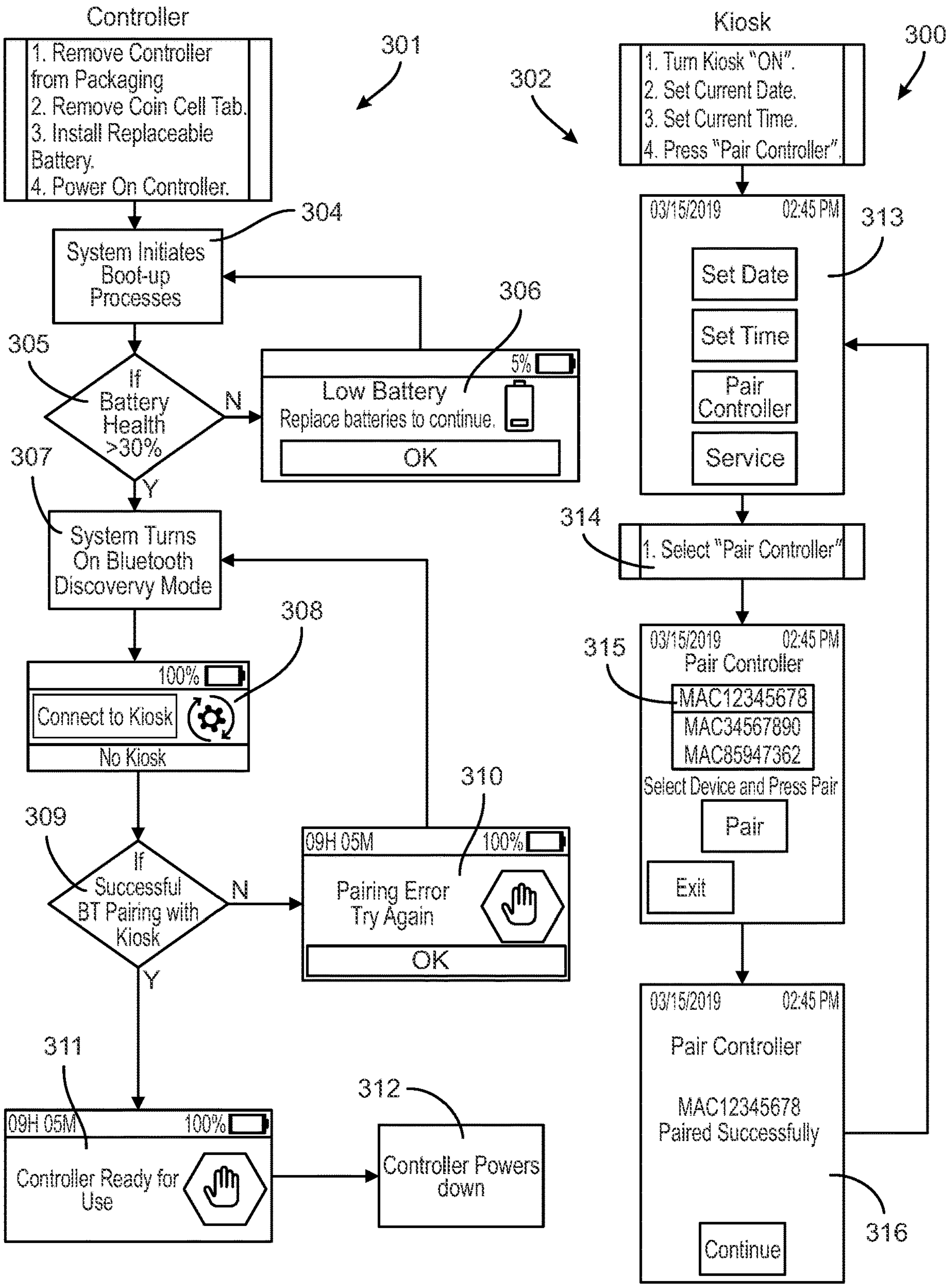
FIG. 13 is a flowchart for initializing a controller for a compression device disclosed herein that is to be paired with a kiosk.

The flowchart 300, shown in FIG. 13, is provided for a controller 14, 14' that is to be paired with a kiosk 80. In this instance, both the DVT cuff controller and the kiosk are activated and follow separate activation flowcharts 301, 302, respectively. In the cuff controller sequence, the first five steps 304, 305, 306, 307, 308 are the same as in the non-kiosk controller activation of flowchart 200 in FIG. 12. However, in step 308 the program flow continues based on the cuff controller being in use with a kiosk, in which case a determination is made in step 309 whether the cuff controller has paired with the kiosk. If not, then an error message is displayed in step 310 and the process returns to step 307 to activate the wireless or Bluetooth mode. If the pairing is successful, a message is displayed on the controller screen 15 in step 311 and the controller is powered down in step 312 pending future use by a patient.

It is understood that conventional Bluetooth pairing technology can be implemented between the controller and the kiosk. It should also be understood that the pairing step requires activation of the kiosk according to the flowchart 302. Thus, when the kiosk data processor 84 is activated an initial set-up screen is displayed in step 313 that allows the operator to set the date and time and then activate the pairing sequence in step 314. A pairing screen is displayed on the kiosk processor 84 as shown in step 315 in which a table of uniquely identified cuff controllers within the vicinity of the kiosk are detected. The user can select the appropriate controller for pairing, after which a successful pairing is displayed in step 316.

Figure 14:
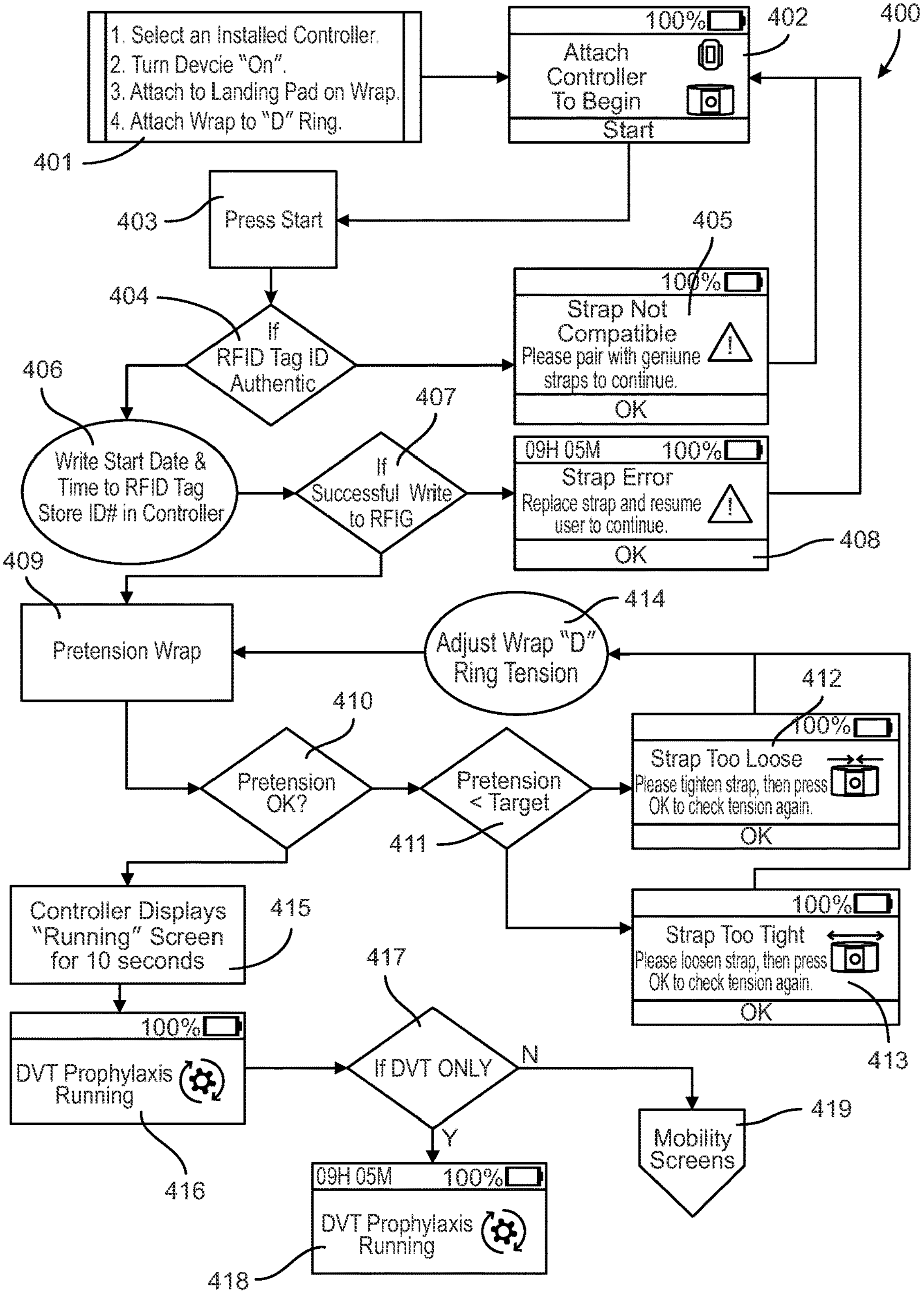
FIG. 14 is a flowchart of controller operation of a compression device disclosed herein in a DVT prophylaxis mode of operation.

The flowchart 400 in FIG. 14 shows the steps implemented by the DVT cuff controller in the DVT prophylaxis mode of operation. This mode of operation starts with a selected controller 14, 14' activated to run through the initialization steps described in connection with the flowcharts 200, 300 in FIGS. 12-13. The selected controller is mounted to a wrap 12, 12' in step 401, in response to a display in step 402 on the controller screen 15. The authentication process for the wrap is initiated in step 403 and the on-board RF sensor 56 of the controller reads the RF chip 65 of the wrap in step 40. If the identifier does not match with the database of proper identifiers, the controller displays the message in step 405 that that cuff is not compatible with the controller—i.e., that the cuff is not authentic for use as the DVT compression device.

On the other hand, if the RFID is authenticated the controller writes a start date and time to the RF chip 65 of the wrap 12, 12' and stores the identifier of the wrap in the memory of the controller 14, 14'. The controller checks in step 407 whether the two writes were successful, and if not generates an error message in step 408 and returns controller to the initial step 402. If the writes were found to be successful in step 407 then program flow proceeds to step 409 in which the pre-tensioning of the strap is conducted. In this first step, the patient, or preferably the medical personnel, adjusts the end loop 24 of the strap on the D-ring 22 of the controller 14, 14' to initially tension the wrap on the patient's limb, typically the leg. In the first step 410 the controller measures the force in the wrap and determines whether the proper amount of pre-tensioning, or tightness, of the wrap has been achieved. In one specific embodiment, that force value is 1.0 lbf, which has been found to be an optimum starting tension for the DVT prophylaxis protocols. If the amount of pretension is not at the desired value, the controller seeks to determine whether the wrap is too loose or too tight in step 411. If it is too loose a message is displayed in step 412 and if too tight a commensurate message is provided in step 413. In step 414 the patient or medical personnel adjusts the end loop 24 on the D-ring 22 to adjust the pre-tension of the cuff. This process continues until the wrap is properly tensioned. In an alternative embodiment, if the wrap is less than the desired pre-tension force by a pre-determined amount, the controller can activate the motor 32 to pull the D-ring 22 until the requisite pre-tensioning force is reached. Of course, if the current wrap force is greater than the desired pre-tension force the motor cannot relieve the tension in the wrap—only adjusting the loop on the D-ring can reduce the initial tension in the wrap.

Once the amount of pre-tension or initial force has been achieved the controller initiates the DVT protocol in step 415 and displays a "DVT Prophylaxis Running" message on the controller screen. In step 417 it is determined whether the DVT cuff is to be operated in the DVT-only mode or in the DVT+mobility mode. This determines whether the "DVT Prophylaxis Running" screen continues in step 418 or whether additional displays for the mobility function are displayed in step 419 (see FIG. 16). In the former case, the "DVT Prophylaxis Running" screen continues as long as the DVT compression protocol is active. This protocol can be continued for a pre-determined time or a pre-determined number of compression cycles, either of which are monitored and controlled by the controller 14, 14'.

As explained above, the DVT cuff of the present disclosure contemplates the removal and replacement of a controller from the wrap of a particular patient. The present disclosure also contemplates removing a current wrap for a patient and replacing it with a new wrap. After an extended period of use a wrap may become soiled with sweat or other fluids so that a new wrap is required. The wraps disclosed herein are intended to be disposable so there is no particular benefit to removing, cleaning and replacing a particular wrap, especially in a hospital setting. The method for changing a given wrap for a new wrap is illustrated in the flowchart 500 of FIG. 15. In the first step 501, the current controller is deactivated and then detached from the current wrap, which can then be discarded in a conventional manner. The new wrap is provided and the current controller attached to the new wrap in step 502. The authentication process is commenced in step 503 with the RF chip 65 of the new wrap being read in step 504 and compared to the database of acceptable identifiers, as in the initial use of the wrap explained in the flowchart 400. A message is displayed in step 505 if the new wrap is not properly authenticated. Otherwise, the process flow continues to step 506 in which the RF identifier stored in the controller 14, 14' is updated to the identifier of the new, properly authenticated, wrap. The identifier is again authenticated in step 507, and the new start date and time for the particular wrap is written onto the RF chip of the new wrap and the new identifier is written to the current controller. If the writes are determined to be unsuccessful in step 509, the error message of step 510 is displayed and the process returns to the initial step to verify proper mounting of the controller onto the wrap. If the writes are successful, then the pretensioning process steps 511-516 are executed in the same manner as the steps 409-414 discussed above in connection with flowchart 400. Likewise, once the pre-tensioning has been completed the controller advances to the DVT prophylaxis and mobility activities in steps 517-521 that are similar to the steps 415-419 in flowchart 400.

Figure 16:
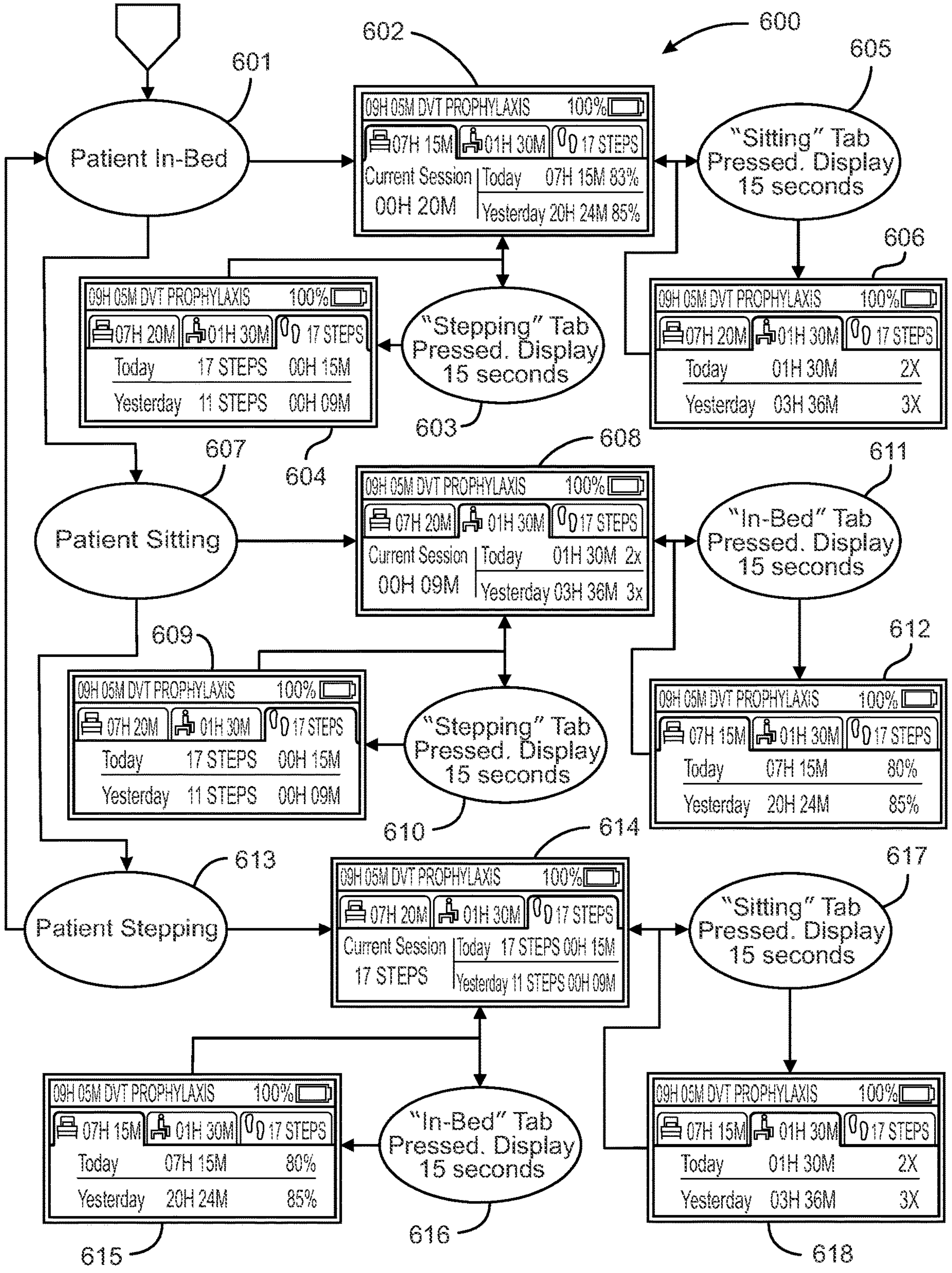
FIG. 16 is a flowchart of displays in different modes of operation of the controller for the compression devices disclosed herein.

The mobility displays are provided in the flowchart 600 of FIG. 16. The controller makes a determination of the position or activity of the patient based on the data obtained from accelerometer 55 or other physiological sensors incorporated into the controller 14, 14'. The patient may thus be reclined, step 601, sitting, step 607, or walking, step 613. Each state of the patient has a related set of screens that are shown on the touch-screen display 15 of the controller. When the patient is reclining or in bed, the screen display in step 602 highlights or illuminates the display box 102 (FIG. 10A) corresponding to the "in bed" screen. However, the user can switch the display to one of the other two screens by pressing the corresponding tab 103, 104 on the touch-screen display. Touching one of the other screens for 15 seconds in steps 603, 605 causes the controller to switch the screen to the associated "walking" or "sitting" display in steps 604, 606, respectively. The same process applies when the display is initially in the "sitting" display of step 607, with steps 608-611 executed to change the display to the "in bed" or "walking" screens, or when the display is initially in the "walking" display of step 613, with steps 614-617 executed to change the display to the "in bed" or "sitting" screens. This feature allows the medical personnel to always get a complete picture of the patient's compliance to the prescribed DVT prevention protocol.

With respect to patient compliance, as discussed above compliance to a DVT protocol is often problematic. Likewise, determining the level of patient compliance has always been difficult, often requiring first-hand knowledge of the medical personnel as to whether the patient has engaged in the requisite physical activity and activated the DVT cuff according to the prescribed protocol. The DVT cuff 10 of the present disclosure provides the medical personnel with significant information to assess the level of compliance for a particular patient. In addition to the various displays described above, the pre-tensioning steps also assure compliance. If the cuff is not properly wrapped on the patient's limb with the proper amount of pre-tension force, the controller will not allow the DVT prophylaxis sequence to commence. The RF chip of the patient's wrap can store time and date information regarding the starting and completion of a DVT prophylaxis sequence, information that can be accessed by the medical personnel to verify patient compliance. Moreover, the controller can display information indicative of patient compliance, such as the "DVT Prophylaxis Running" message (see steps 416, 418 in FIG. 14 for example), or an error message when the wrap is not properly placed on the patient's limb. The RF chip 65 can also store error messages indicative of non-compliance that can be accessed by the medical personnel.

Figure 17:
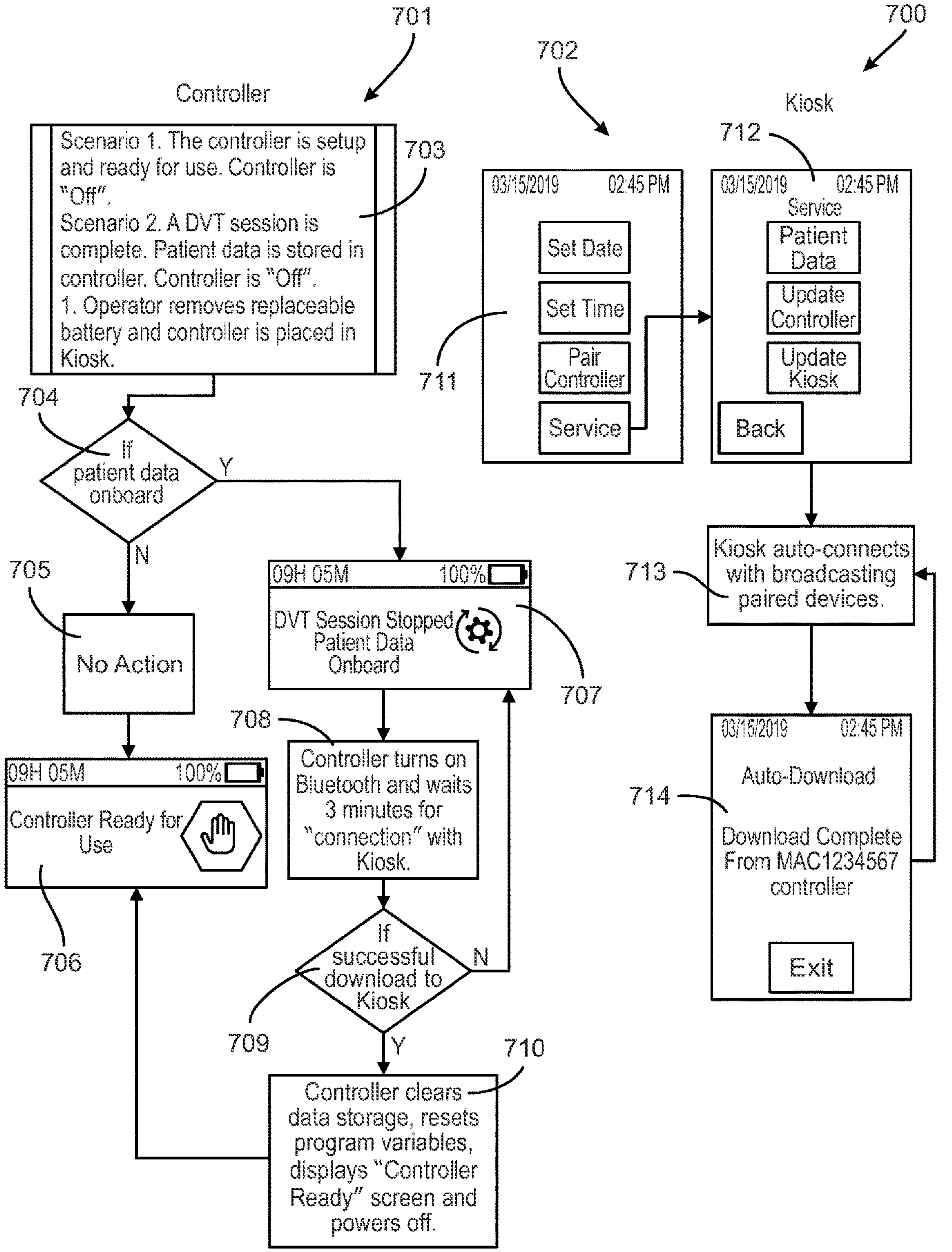
FIG. 17 is a flowchart of controller operation for storage of a compression device disclosed herein.
Figure 18:
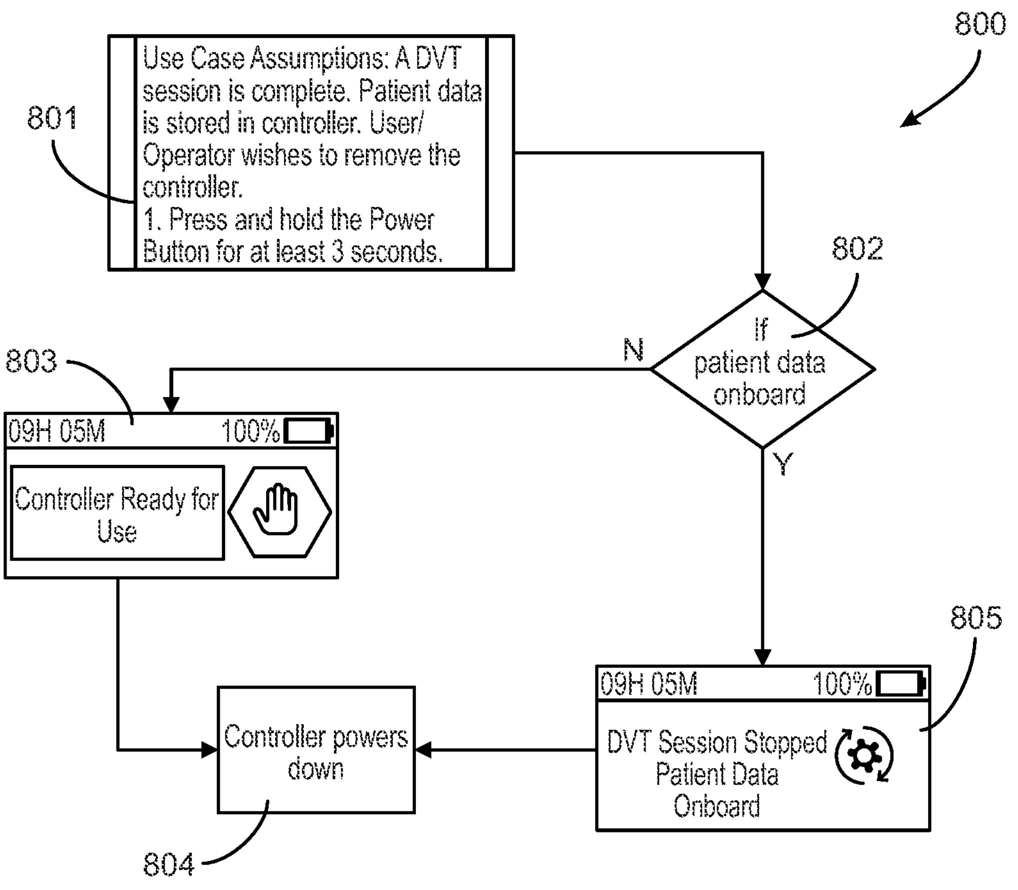
FIG. 18 is a flowchart of controller operation for removal of a compression device disclosed herein from a patient.

Once a particular controller is no longer in use the controller can be stored, such as in the kiosk 80 described above. In this instance, the controller and kiosk follow a flowchart 700 for the storage of the controller, as shown in FIG. 17. The flowchart 701 for the controller includes a first step 703 for storing the controller under two scenarios. In the first scenario, the controller is set-up and ready for use, while in the second scenario the controller has just been used by a patient. In both cases the controller is turned off and the replaceable battery removed for placement in a charging station in one of the bays 82 of the kiosk 80. In step 704 it is determined whether the controller contains patient data uploaded from the RF chip of the patient's wrap. If no, then control passes to step 705 in which a "Ready for Use" message is displayed in step 706. It is noted that in one embodiment of the present disclosure the display 15 is an e-ink display so that the "Ready for Use" display remains on the screen even when the controller is powered down.

If the controller includes uploaded patient data the controller displays a message in step 707 and activates the wireless or Bluetooth communications between the controller and the kiosk in step 708. The controller times out after a predetermined "connection" time and determines whether the data was successfully downloaded to the kiosk in step 709. If not, then the controller returns to steps 707, 708 to attempt the download again. If the download was successful, the controller clears its memory of the patient data, resets any control variables that may have been modified, activates the "Ready for Use" display in step 706 and powers down the controller.

On the kiosk side 702 of the flowchart 700, the kiosk processor displays the selection screen in step 711 in which the user can select "Service" to move to the display in step 712. This screen allows the user to select from the service functions of uploading patient data, updating the controller software/firmware or updating the kiosk software/firmware. For the controller storage, the user selects uploading the patient data and the kiosk processor automatically connects with the previously paired controllers in step 713. The automatic download process occurs in step 714 followed by a message on the kiosk processor that the download was complete, along with the identifier for the particular controller. It is understood that multiple controllers can be stored in a given kiosk so the downloads may be from multiple controllers. The patient-related data is maintained in a memory of the kiosk processor for subsequent review and/or processing by medical personnel. The kiosk may be paired with another device, other than a DVT cuff controller, which allows downloading of patient data to the device, such as a smart phone or smart pad, which can be reviewed by the medical personnel.

At the end of a DVT session by a patient, it is desired to remove the controller from the wrap associated with the patient. Flowchart 800 illustrates the steps with the first step 801 being to press and hold the power button for a certain time, such as three seconds. This activates the controller to determine whether any patient data is onboard the controller memory in step 802. If not, then the "Controller Ready for Use" message is generated in step 803, after which the controller is powered down in step 804. If patient data is found, then this data is uploaded in step 805, after which the controller is powered down in step 804. In one aspect, step 802 can first determine whether the RF chip 65 of the wrap includes patient usage data, and then upload that data to the controller processor memory.

Figure 19:
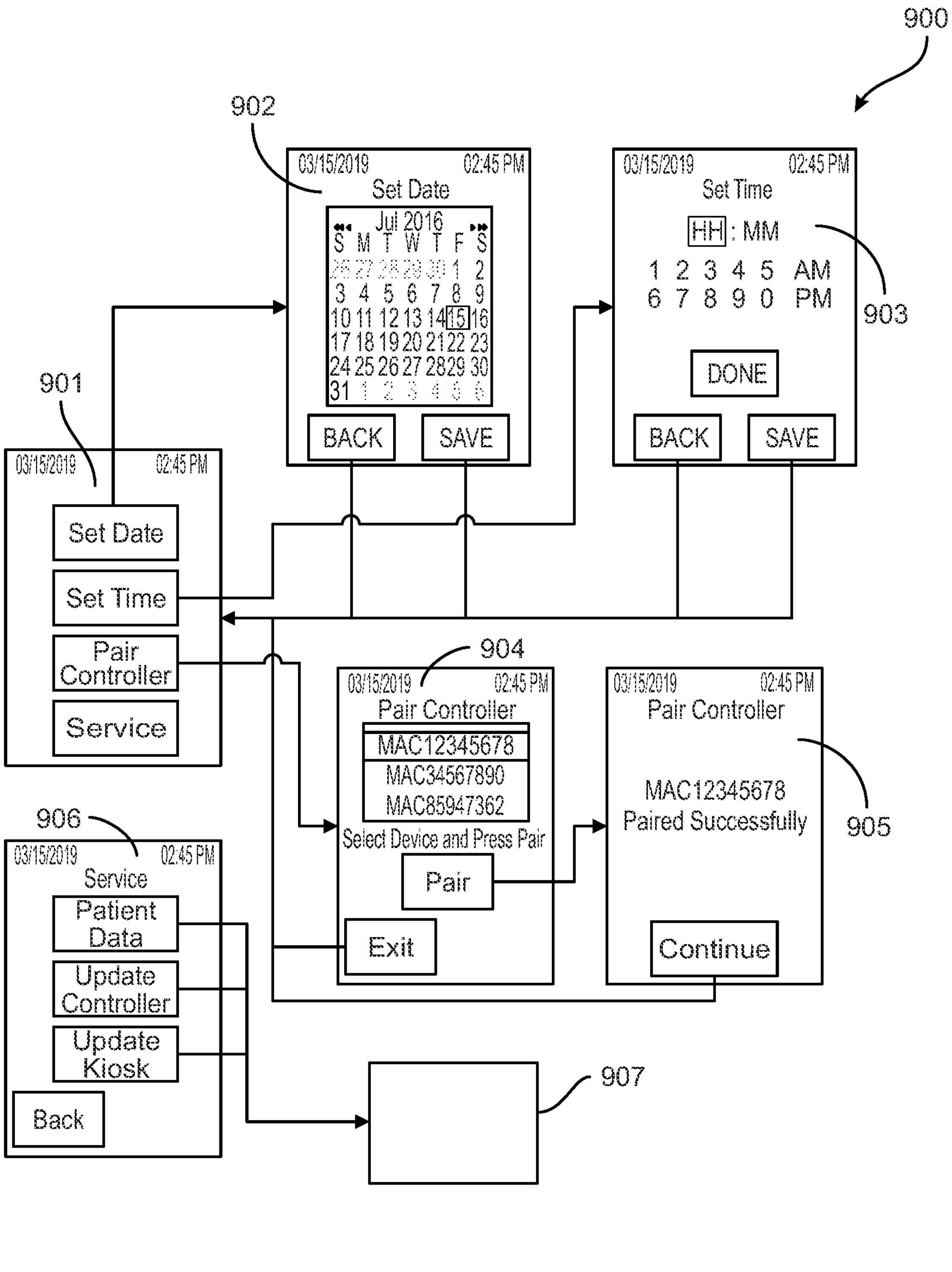
FIG. 19 is summary of display screens generated by the kiosk of FIG. 9.

FIG. 19 provides a summary of the display screens 900 generated by the kiosk processor. The main screen 901 provides access to the various tasks performed by the kiosk, including setting the date 902 and time 903. The kiosk can be paired to multiple controllers through screens 904, 905. Selecting "service" in the main screen leads to the service screen 906 that allows selection of different sources of downloaded information, as described above, that are automatically downloaded in step 907 when selected.

Figure 20:
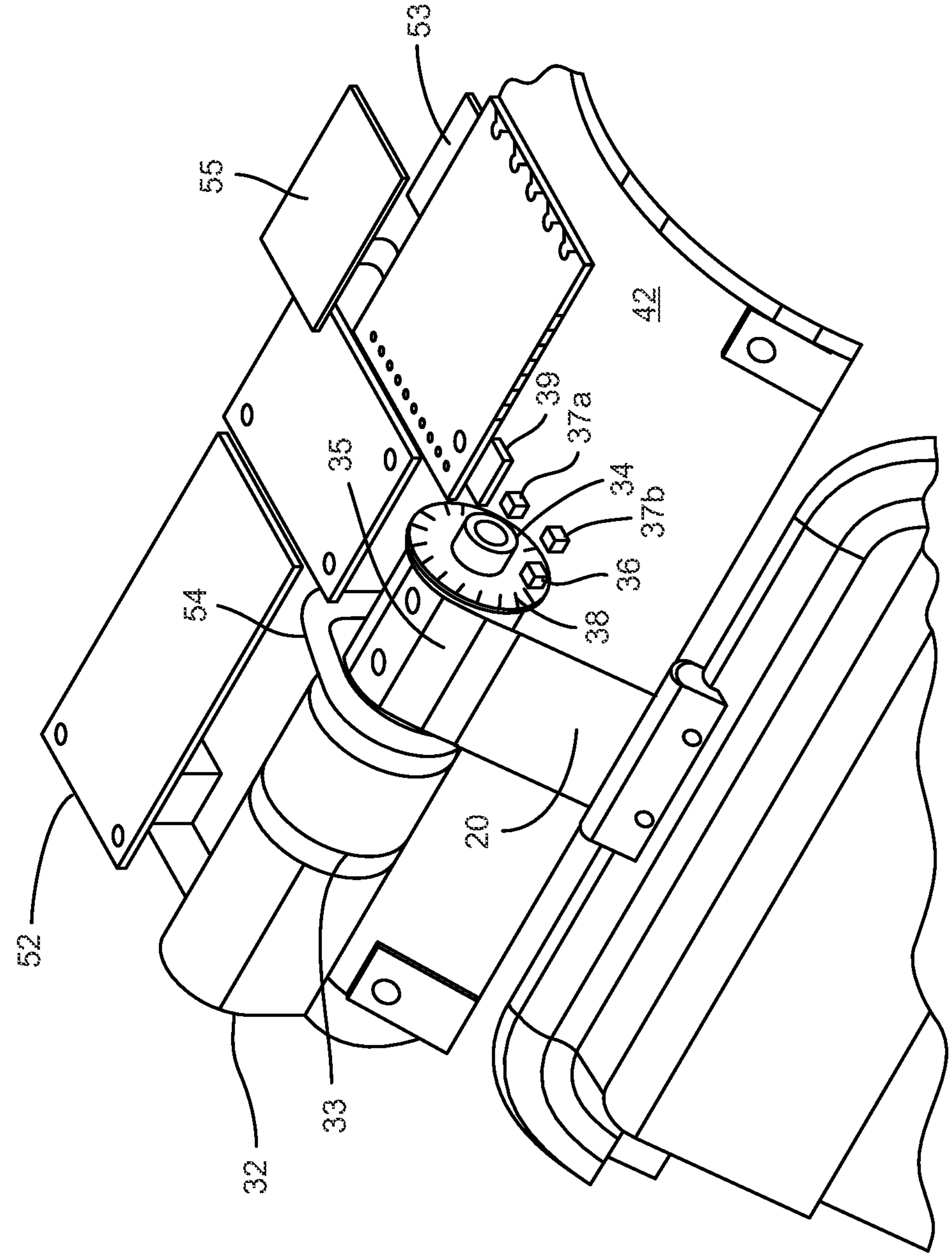
FIG. 20 is a detail view of the drive pulley for the device shown in FIGS. 1-7.

In one modification of the controller 14, the pulley 34 can incorporate a hard stop component 36 that is configured and arranged to contact a hard stop component 37*a* mounted on the base plate 42, as shown in FIG. 20. The two hard stops 36, 37*a* prevent rotation of the pulley beyond the hard stop 37 on the base plate. This mechanical stop thus limits the rotary travel of the pulley 35 in the direction of compression, thereby limiting how far the wrap 12 can be tightened on the patient's limb. It can be appreciated that the amount of movement of the wrap 12 is based on the amount of travel of the strap 20 to which the wrap is connected, or the amount that the strap wraps around the pulley 34. This travel distance in turn is a function of the circumference (and thus diameter) of the pulley. The mechanical stops 36, 37*a* prevent rotation of the pulley beyond 360°, so the maximum distance that the strap 20 can be pulled by the pulley 24 is less than the circumference of the pulley. In one specific embodiment, the pulley can have a diameter of 0.5 inches, so that the maximum travel of the pull strap is less than about 1.5 inches. This amount of travel is sufficient to produce a compressive force on the calf of a patient, for instance, that exceeds a desired maximum compression force, which in one specific embodiment can be 9 lbf.

The controller can further include a switch or sensor 37*b* corresponding to a "home" position for the strap 20, meaning the position in which the strap 20 is extended to its maximum position from the pulley 20. It is in this "home" position that the wrap 12 is engaged to the D-ring 22 attached to the strap 20, and it is to this "home" position that the pulley, and therefore the wrap, is returned at the end of a treatment cycle. The stop 38 on the pulley can be in the form of a tab that engages the switch or sensor 37*b* when the strap and wrap are in this "home" position. The switch 37*b* is thus connected to the microprocessor 52 and may also be connected to the motor controller 53 to automatically shut off the motor 32 when the pulley is at the "home" position. Alternatively, the microprocessor can direct the motor controller in response to receiving a signal from the switch 37*b*.

In a further feature, the pulley 34 can be configured so that the amount of rotation of the pulley can be accurately determined with a rotary encoder, such as encoder 39 mounted to the base plate 42 shown in FIG. 20. The pulley 34 can thus include encoder markings 38 that can be detected and counted by the rotary encoder 39. The encoder markings depicted in FIG. 20 are for illustration only, since it is contemplated that a large number of encoder markings would be provided on the pulley to permit exact measurement of the degree of rotation of the pulley. Thus, in one specific embodiment, the pulley 34 can be provided with 1500 encoder markings, with the rotary encoder 39 capable of distinguishing the finely positioned markings. It is noted that any rotary encoder is contemplated that can fit within the envelope of the device 10 and that are capable of fine measurement of the amount of rotation of the pulley from a home position, including magnetic, optical and mechanical encoders. In another embodiment, the encoder can be associated with the drive shaft of motor 32 before the transmission 33. In this embodiment, the encoder can have a finer resolution since the motor is rotating at a higher speed than the pulley 20, since the pulley is geared down by the transmission.

The encoder 39 communicates with the microprocessor 52, providing a signal or pulse to the microprocessor each time an encoding marking passes. The microprocessor is configured to count the pulses received from the encoder during movement of the pulley in the compression direction—i.e., in the direction that pulls the strap 20. The pulse count can be used to accurately determine a neutral or starting position for a compression cycle as well as the position in which the compression stops and the wrap 12 is relaxed on the patient's limb.

The pulse count is automatically reset to zero when the pulley 34 is at the "home" position. In particular, when the stop 36 engages the switch 37*b*, the microprocessor or motor controller can reset the pulse count, if any, to identify the home position.

Figure 21:
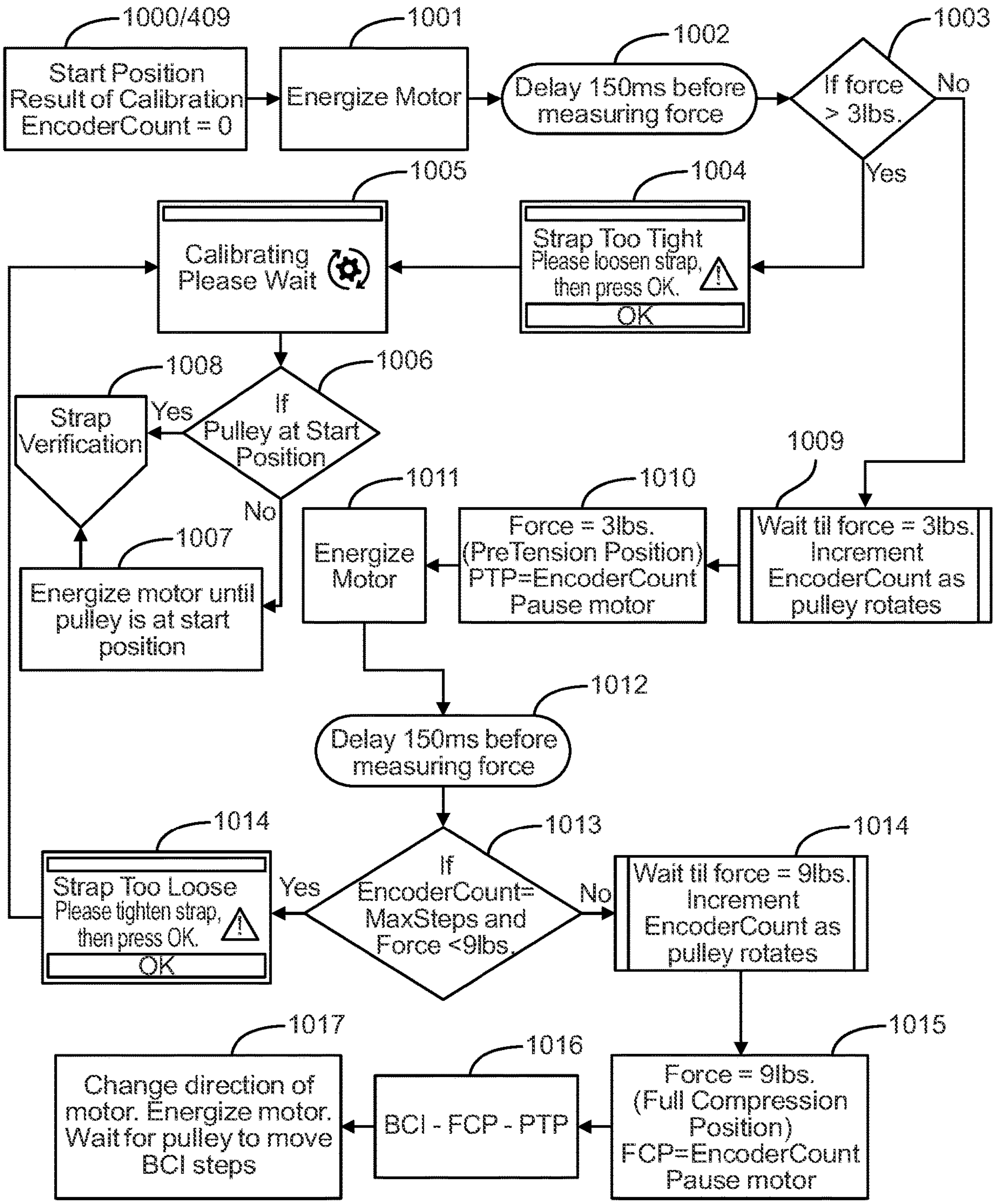
FIG. 21 is a flowchart of controller operation for pretensioning a compression device disclosed herein.

The encoder 39 facilitates pretensioning the wrap 10 in anticipation of a compression treatment protocol. Thus, in one embodiment, the pretensioning steps 409-413 in the flow chart of FIG. 14 can be accomplished according to the steps shown in the flow chart of FIG. 21 to be performed by the microprocessor 52 and/or the motor controller 53. Thus, the pretensioning step 409 of FIG. 14 commences with establishing the start position of the pulley in step 1000 of FIG. 21. In this step the motor 32 is operates in the "unwind" direction (i.e., counter-clockwise in FIG. 20) so that the stop 36 on the pulley 34 moves toward the switch 37*b*. When the stop contacts the switch the start position of the motor and pulley is established and the microprocessor (or controller) sets the number of encoder pulses to zero. From this initial home position, any rotation of the pulley in the "winding" or "tightening" direction (i.e., clockwise in FIG. 20) will increase the pulse count and rotation in the opposite direction will reduce the pulse count. In this respect, the microprocessor knows the rotational direction of the motor—clockwise (increasing count) or counter-clockwise (decreasing count). With the home position established, the motor is energized in step 1001 for rotation in the tightening (clockwise) direction. The motor is rotated for a predetermined time, such as 150 milliseconds, after which the force exerted by the strap on the patient is measured. As described above, the force can be measured as a function of motor current, which means that the motor must be rotating at the time of the measurement. Moreover, due to hysteresis effects in the motor, an accurate current reading cannot be obtained immediately, hence the 150-millisecond delay in measuring the initial force. Alternatively, the force can be measured by the load cell described above, which can occur with the motor rotating or stopped.

In step 1003 the measured force is evaluated to determine whether it exceeds a desired pretension load. In the illustrated embodiment, the pretension load is set at 3 lbf, which has been determined to be an optimal compression force as a baseline for a continuing compression protocol that does not restrict blood flow or cause discomfort to the user while ensuring that the cuff remains in position on the patient's limb. If it is found that the load exceeds the desired pretension load, a message is displayed on the screen 15 in step 1004 indicating that the strap is too tight. In this case, control passes to calibration steps 1005-1008 in which it is either determined in step 1006 that the pulley is at its start of home position set in step 1000 or the motor is actuated in the reverse (loosening) direction to return the pulley to its home position in step 1007. Then in step 1008 the user, patient or medical personnel adjusts the wrap on the D-ring, in particular by loosening the wrap on the D-ring, as reflected in step 414 of the flowchart of FIG. 14. With the strap adjusted the pretensioning steps 1001-1003 occur again.

If after the predetermined time in step 1002 the measured force is less than the pretension force (i.e., 3 lbf), control passes to step 1009 in which the pulley is stepwise rotated to tighten the strap until the pretension force (3 lbf) is reached. The encoder pulses are counted as the pulley rotates and the pulse count at the pretension force is stored in a memory within the microprocessor and/or controller in step 1010 as a value PTP—pre-tension position. The microprocessor 52 and/or controller 53 now know the angular position of the pulley 34 at the baseline or pretension force. The microprocessor and motor controller control the rotation of the motor during a compression cycle to return the pulley to the PTP at the end of one cycle and start of a new cycle.

The next step in the calibration and pretensioning process is to determine if the wrap 12 is too loose on the patient/user. If the wrap is too loose the device will not be able to generate the desired compression necessary to perform the desired function of the device, such as DVT prevention. Thus, in step 1011 the motor is energized again to rotate in the compression direction (clockwise) starting from the pretension force and PTP. The motor is rotated for a predetermined time in step 1012, such as 150 ms, after which the tension force is measured in the manner described above. The measured force is compared in step 1013 to a desired full compression force that has been found to generate the desired compression, such as 9 lbf. If the measured force is less than the desired full compression force it is determined that the wrap is too loose and a message is displayed in step 1014 to that effect. Control then returns to the calibration steps 1005-1008 to allow for manual re-adjustment of the wrap on the D-ring. The calibration and pretensioning then starts again at step 1000.

If the result of step 1013 is that the measured force is less than the desired maximum compression force (i.e., 9 lbf), then the motor is incrementally rotated in step 1014 until the measured force reaches the desired value. In step 1015 the number of encoder pulses accumulated to reach the desired maximum compression force is stored in the memory as a value FCP—full compression position. The microprocessor and/or motor controller now know the angular rotation of the pulley that corresponds to the desired maximum compression force exerted on the patient. This value FCP is used by the microprocessor and/or motor controller during a compression protocol to determine when to reverse the motor and release the compression exerted by the wrap on the patient's limb. A patient-specific value BCI—body compression index—is calculated in step 1016 as the difference between the number of encoder pulses at full compression (FCP) and the number of encoder pulses at the pretension position (PTP)—i.e., BCI=FCP—PTP. The BCI value is used by the microprocessor and/or motor controller to determine the amount of forward (tightening or compression) rotation and reverse (loosening) rotation during a compression cycle to ensure that the compression force stays within the desired range—i.e., the range between the pretension force and the maximum compression force.

Figure 22A:
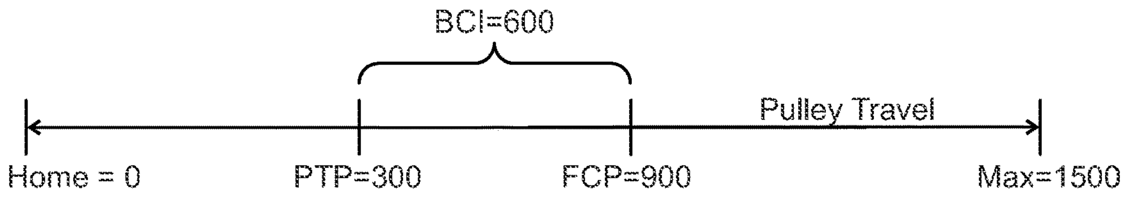
FIGS. 22A-22B are graphs of pulley travel as it relates to body compression index (BCI).

The BCI is a patient-specific value that is a function of the anatomy of the patient's limb, such as the circumference of the limb and the density of the muscle and soft tissue. Thus, while a typical male patient might have a BCI of 600 a patient with a larger calf may have a BCI of 650. This difference is illustrated graphically in FIGS. 22A-22B. In the example of FIG. 22A, the PTP for the particular patient is 300 encoder pulses from the home position of the pulley—i.e., the pulley rotates through 300 encoded markings 38 on the pulley until the wrap reaches the pretension compression of 3 lbf. As the motor and pulley continues to rotate, the pulley reaches the point of maximum compression (9 lbf) at an FCP of 900 pulses. The difference of 600 (900-300) is the BCI for that patient.

Figure 22B:
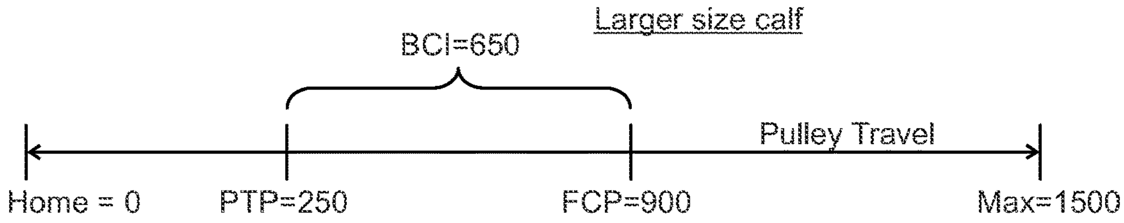

On the other hand, the patient in the example of FIG. 22B has a larger and/or more dense limb so that the number of pulses, corresponding to the amount of angular rotation of the pulley, to reach the pretension force of 3 lbf is less than for the patient in the example of FIG. 22A. For this patient of FIG. 22B the point of maximum compression force (9 lbf) is also at an FCP of 900. The BCI for this second patient is thus 650 (900-250) is greater than the BCI for the first patient. This means that the motor rotates longer from the pretension position for the second patient to reach the maximum compression force than for the first patient to reach the compression force.

Figure 23A:
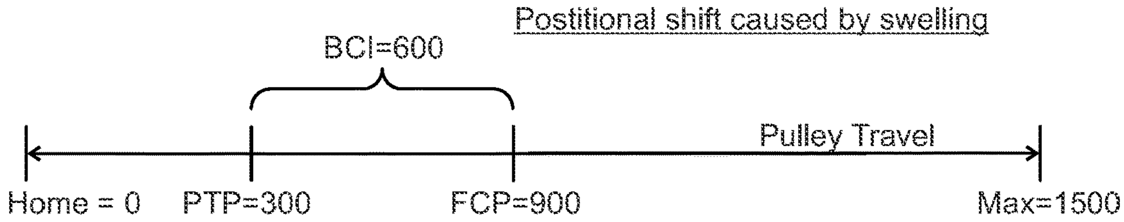
FIG. 23A is a graph of positional shift of BCI caused by patient swelling.

The BCI can be used during a compression protocol to account for deviations. For instance, the patient's limb may swell during a treatment which would cause a shift in the PTP and FCP as a function of the total pull strap travel, as depicted in FIG. 23A. The device can continuously monitor the applied force to ascertain that the amount of pulley rotation and pull strap travel to reach the pretension force (3 lbf) has decreased, indicating that the patient's limb has swollen and that this swelling is exerting a counter-pressure that leads to the measured force to exceed the pretension force. In this condition, the pretention position PTP can be shifted to the left in FIG. 23A relative to the calibration position for the same patient shown in FIG. 22A. The BCI, however, remains the same so that the ensuing compression cycles will occur over the same pulley rotation corresponding to a BCI of 600 pulse counts. The BCI thus provides a mechanism for adapting the operation of the compression device to physiological changes in the patient, while preserving the pre-tension and maximum compression forces.

Figure 23B:
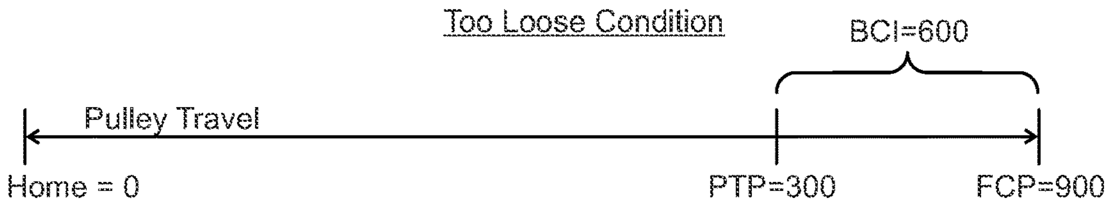
FIG. 23B is a graph of positional shift of BCI caused by the compression device being too loose.
Figure 23C:
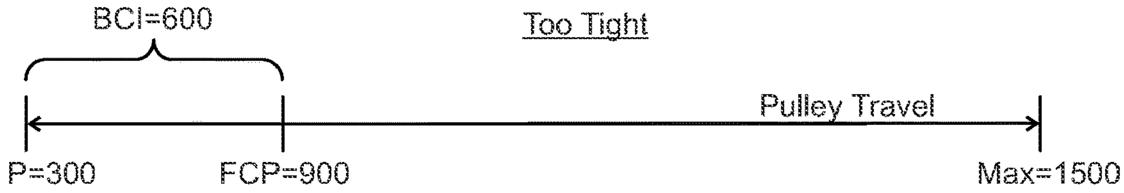
FIG. 23C is a graph of positional shift of BCI caused by the compression device being too tight.

As shown in FIG. 23B, the wrap can loosen during a compression protocol which causes the BCI band to shift to the right in FIG. 23B relative to the calibration position shown in FIG. 22A. If the FCP reaches the maximum pulley rotation, which can be 2000 pulse counts in one example, it can be determined that the wrap is too loose on the patient, rendering any compression ineffective. In this instance, a warning can be displayed on the device screen 15 accompanied by an audible alarm to alert the medical personnel or user that the device needs attention. Similarly, if the wrap becomes too tight, such by the patient tightening the wrap, the BCI band shifts to the left in FIG. 23C so that the PTP reaches the home position. In this position, further tightening of the wrap can risk injury to the patient, so a visual warning and audible alert can be generated by the device alerting the user or medical personnel that the compression device needs immediate attention.

Figure 15:
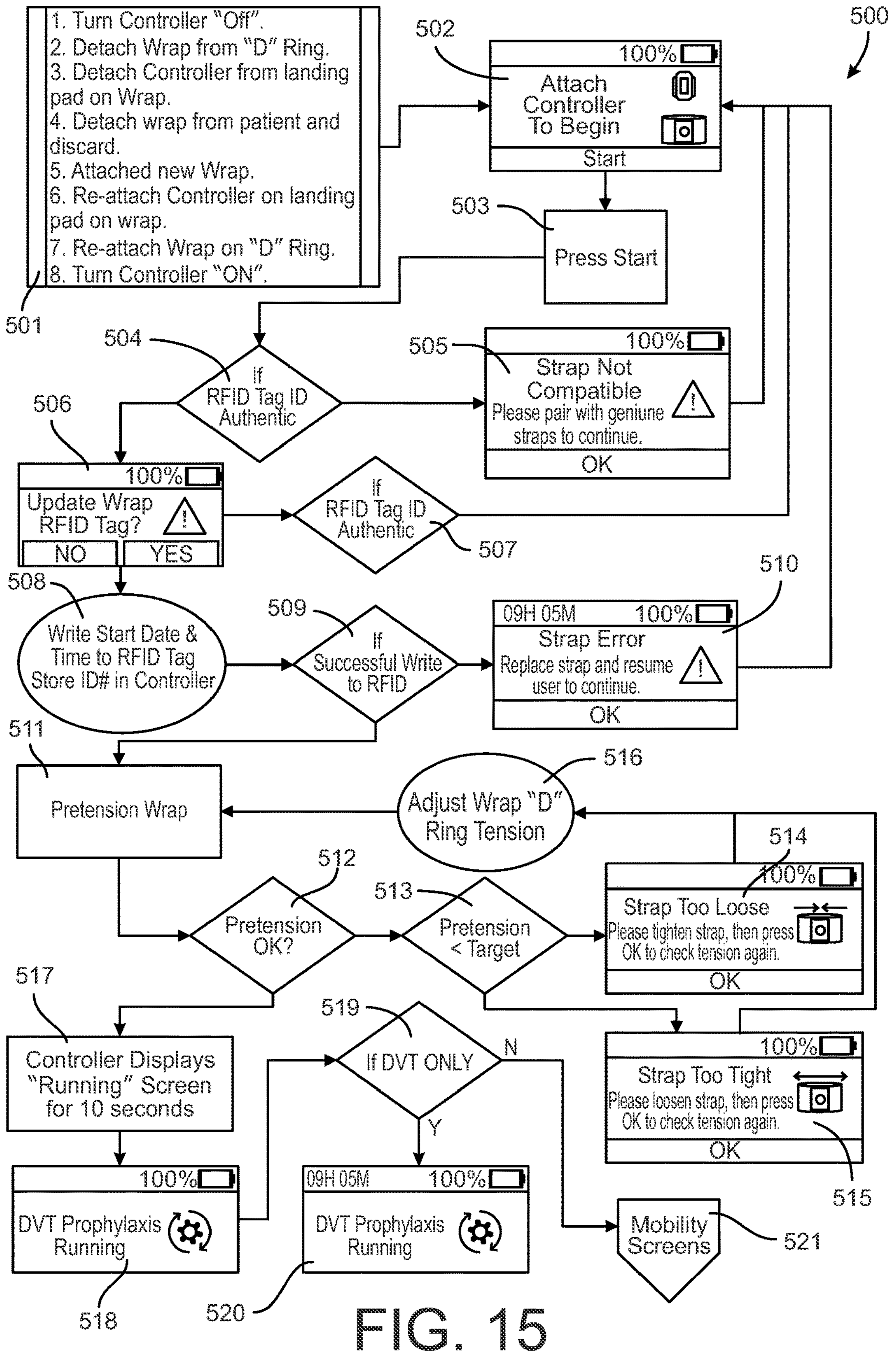
FIG. 15 is a flowchart of controller operation for replacing a wrap of a compression device disclosed herein.
Figure 24:
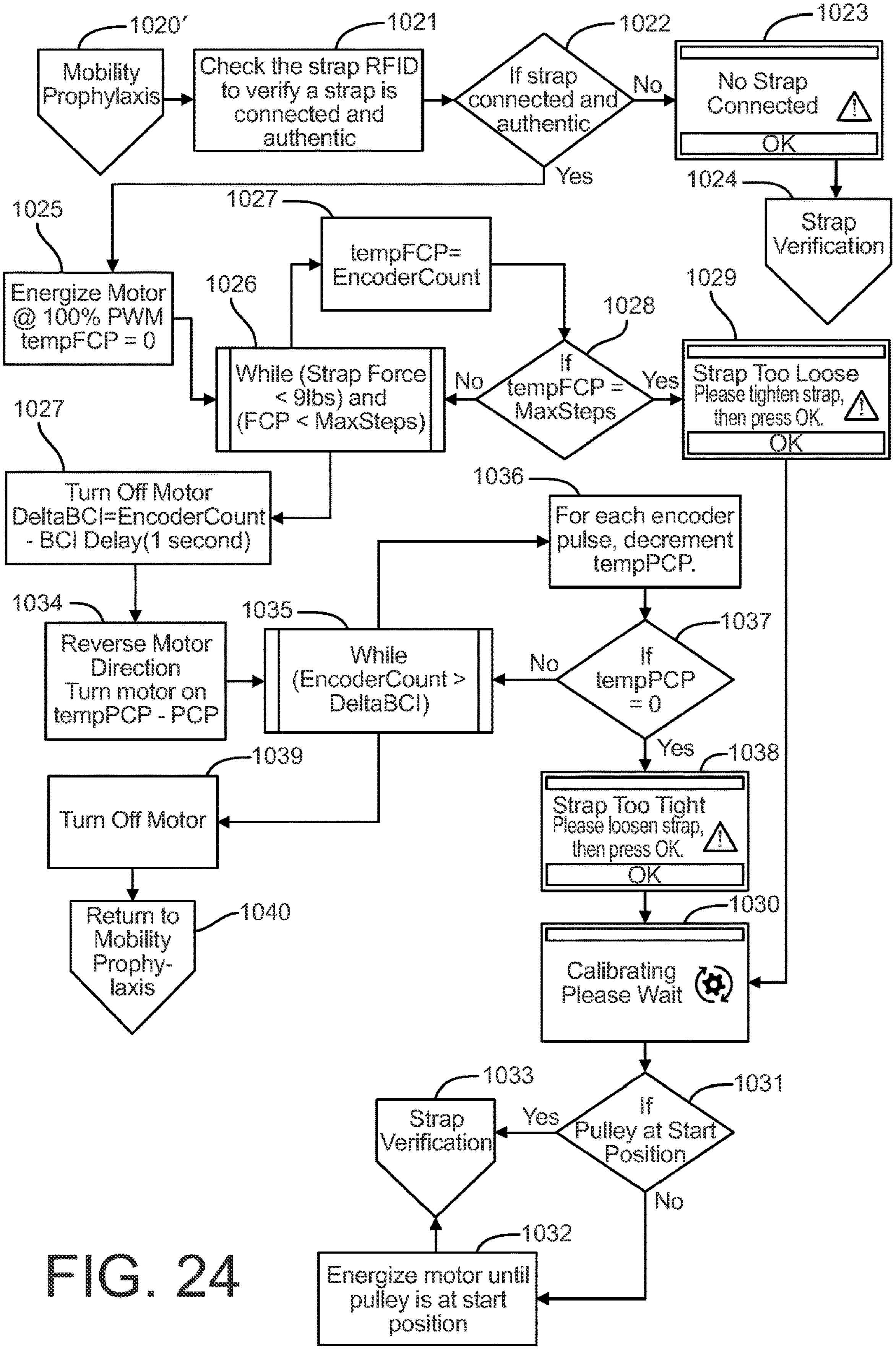
FIG. 24 is a flowchart of controller operation for performing DVT compression.

The flowchart of FIG. 24 shows one firmware or software program flow for performing DVT compression that may be implemented in step 418 of FIG. 14 or step 520 of FIG. 15. Steps 1021-1022 verify that an authentic compression wrap is engaged to the controller D-ring. If not, then control passes to steps 1023-1024 in which the user or medical personnel attaches a proper wrap to the device. It is noted that these steps—i.e., verifying the wrap—can occur earlier in the process, as illustrated in the flowcharts of FIGS. 14-15, as well as every time a DVT compression protocol commences.

If a proper strap is found, the motor is energized by the microprocessor and/or motor controller in step 1025 so that the motor is now operated at its 100% PWM condition to tighten the wrap. The encoder pulses are counted in step 1027 as long as the measured compression force is below the desired maximum force (in this case 9 lbf) and as long as the FCP is less than the maximum possible encoder pulse count (2000 in one example) indicated in step 1026. The encoder pulse count is stored as a value tempFCP as the motor is operating and the wrap is being tightened around the patient's limb. When the motor is energized in step 1025 the value for tempFCP is set to zero to begin the count. If the tempFCP value reaches the maximum encoder pulse count, ten it is determined that the strap is too loose, as described relative to FIG. 23B. If this determination is made, an error message is displayed in step 1029 and control passes to steps 1030-1033 which are the same as steps 1005-1008 of FIG.

21 described above. In particular, these steps allow the use or medical personnel to correct the loose strap condition.

If the tempFCP value has not reached the maximum encoder pulse count, then the strap is at least not too loose, so the motor continues to operate subject to the condition of step 1026, namely that the maximum compression force has not been reached. Once the maximum compression force has been measured, the motor is de-energized for a predetermined delay (such as 1 second) in step 1027 and a value deltaBCI is calculated, and stored, as the difference between the current encoder pulse count and the BCI determined in the calibration steps described above. The motor is then reversed in step 1034 to loosen the wrap from the maximum compression force and a value tempPCP is stored as equal to the value PCP determined in the calibration steps described above. The value tempPCP is decremented in step 1036 as long as the current encoder pulse count is determined in step 1035 to be greater than the value deltaBCI calculated in step 1027. As long as the condition of step 1035 is met and as long as the value of tempPCP is greater than zero in step 1037 the motor continues to rotate and the value of tempPCP continues to be decremented by the processor. However, if the value of tempPCP reaches zero in step 1037 then the wrap is too tight on the patient. A message is displayed in step 1038 and control passes to the recalibration steps 1030-1033 for adjustment of the wrap as described above.

On the other hand, if the motor properly tightens a properly fitted wrap, the value of tempPCP will not reach zero and the encoder pulse count will eventually reach the value of deltaBCI in step 1035. At that point the motor has fully unwound the wrap to its pretension position so the motor is turned off in step 1039. The processor then redirects control in step 1040 to the beginning of the DVT compression at step 1020 to initiate another cycle of the DVT compression protocol. It can be appreciated that each of the steps shown in the flowchart of FIG. 24 is repeated at each compression cycle in order to ensure that the wrap is properly engaged and functioning. Alternatively, the initial verification steps 1021, 1022 can be limited to the initial start-up of the compression device. However, the wrap tightness and looseness tests should remain in the program sequence to account for deviations during a given DVT compression procedure.

The wrap 12' for the compression device 10 can be modified as shown in FIGS. 25-27 to facilitate positioning the device on the limb of a patient. As shown in FIG. 25, the wrap 1200 can replace the wrap 12', so the wrap 1200 can be formed of the same material and have the same overall length as the wrap 12' in order to encircle a portion of the patient's body, typically a limb. The wrap 1200 includes a portion 1202 that can correspond generally to the flap 17' of the wrap 12' in that a mounting arrangement 40' is mounted at one end of the portion 1202. Like the flap 17', the portion 1202 is also disposed between a controller 14' (FIG. 27) mounted on the mounting arrangement 40' and the skin of the patient. As shown in FIG. 25, the portion 1202 of the wrap 1200 terminates at end 1204 in a slot 1206 that is configured to receive the opposite end 1210 of the wrap in a loop as depicted in FIG. 26. The slot 1206 thus allows the wrap 1200 to be temporarily mounted on the patient's limb, such as the leg depicted in FIG. 26, before the controller is attached to the wrap. This feature facilitates initial placement of the compression device 10 on the patient since the wrap 1200 and mounting arrangement 40' can be optimally positioned on the patient's limb prior to engagement of the controller. This feature also facilitates removal and replacement of the controller while the wrap is still engaged on the patient, without the necessity of removing the entire device, wrap and all, from the patient.

As shown in FIG. 27, the controller 14' can be mounted on the wrap by engaging the mounting arrangement 40' as described above. The controller is engaged to the mounting arrangement and pivoted toward the portion 1202 with the pull strap 20 fully extended, as shown in FIG. 27. In this configuration, the D-ring 22 is positioned directly above the slot 1206 where the end 1210 of the wrap is looped around. The loop can be detached and the end 1210 fed through the D-ring 22, while still extending through the slot 1206. With the end 1210 passing through the slot the wrap holds its position on the limb of the patient as the end is fed through and looped around the D-ring. The end 1210 can be tightened as needed to provide the initial mounting tension for the wrap 1200, as described above.

The strap 1200, and particularly the portion 1202, is configured to provide a predetermined distance D between the mounting arrangement 40' and the slot 1206, as shown in FIG. 25. This distance corresponds to the extended length of the pull strap 20 relative to the controller 14' that allows the D-ring 22 to be aligned with the slot 1206 as shown in FIG. 27. In one specific embodiment, this distance D is 4.91 inches, while the distance from the mounting arrangement 40' to the edge of the wrap at end 1204 is 5.75 inches. This dimension not only allows proper orientation o the D-ring relative to the slot, it also avoids the problem of bunching of the portion 1202 as the pull strap 20 is retracted during a compression cycle. The portion 1202 of the wrap is engaged to the pull strap 20 by the loop of the end 1210 passing through both the D-ring 22 and the slot 1206. Thus, as the pull strap is retracted it pulls the end loop 1210, thereby reducing the effective diameter of the wrap 1200 and introducing compression. The retraction of the pull strap also pulls the end 1204 of the portion 1202 toward the controller 14'. If the portion is too short, the portion will try to bunch underneath the controller, thereby disrupting the compression applied to the patient. In the illustrated embodiment, the distance D is such that the portion 1202 bunches outside the controller in a manner that does not alter or disrupt the compression force applied to the patient.

The present disclosure provides an alternative approach to pre-tensioning the strap on the patient prior to commencing a new compression cycle. As discussed above, patient compliance is a necessity, meaning that the patient must wear an active DVT cuff for a prescribed time to avoid DVT or other complications. In a hospital setting, the caregiver is responsible for activating and initializing the controller for the DVT cuff of the present disclosure, and for fitting the cuff comfortably on the patient. In an ideal circumstance, the caregiver sets the DVT cuff one time at the optimum tightness, or pretension, on the patient and that initial setting prevails each time the patient wears the cuff. However, in most cases, the tightness of the cuff on a given patient changes over time. For instance, one common adjunct problem for a bed-ridden recovering patient is the onset of edema in which the limbs swell due to retention of fluids. In this case, the DVT cuff at the previous setting is now too tight. Conversely, a patient undergoing a DVT compression treatment might have a decrease in swelling as the edema is treated, so that the DVT cuff at the prior setting is now too loose. This change in tightness can also occur during a compression cycle. In each case, the caregiver must take the time necessary to recalibrate the tightness of the DVT cuff for the particular patient. In a typical hospital setting, the time necessary to recalibrate the DVT cuff for the patient exacerbates the work load of an already overloaded caregiver. In some cases, proper attention to the DVT cuff tightness, and even usage, can be compromised.

The present disclosure provides a streamlined and accurate process for establishing the pretension in the DVT cuff as many times as is necessary throughout the compression protocol for the patient. As described above, the wrap 12, 12', 1200 is tightened by a pull strap 20 connected to the strap by the D-ring 22. The pull strap 20 is wound unto or unwound from the pulley 34 rotatably driven by the motor 32. When the wrap/strap 12, 12',1200 is wrapped around the limb of a patient, the pre-tensioning process starts from a “frap” position of the pull strap and pulley, meaning a position in which the DVT cuff wrap 12, 12', 1200 is wrapped on the patient’s limb with an optimum initial tightness. For the DVT cuff wraps of the present disclosure, the frap position is at a predetermined number of rotational steps of the motor, and thus the pulley, from the “zero” position in which the pull strap 20 is fully unwound. In one embodiment, the maximum number of encoder steps for rotation of the pulley is 1100 steps. However, the usable number of steps is preferably 80% of the maximum, or 880 steps, in order to ensure proper motor performance throughout forward and reverse rotation of the motor/pulley. In order to provide adequate rotation to loosen the wrap as needed, the frap position can be at a rotation of 28-32% of the maximum, or preferably 325 encoder steps from the zero position.

Figure 28:
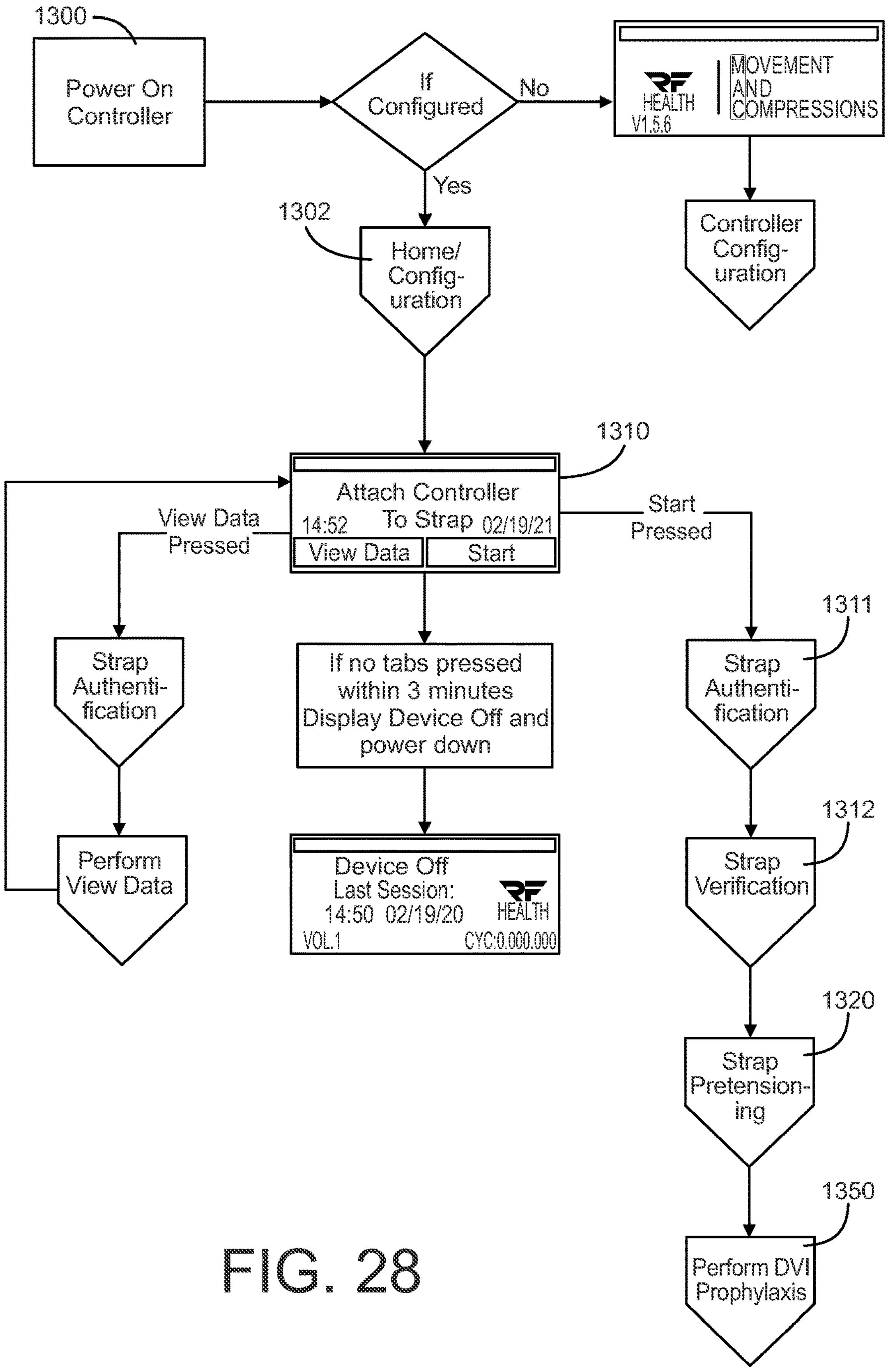
FIG. 28 is a flowchart of controller operation for booting up a wrap as disclosed herein.

The general system flow of the software controlling the operation of the wrap 12, 12', 1200 is shown in the flowchart of FIG. 28. When the controller 14, 14' described above is powered on in step 1300, the software commences a boot-up routine to ensure that the controller is properly functioning and configured. Once the boot-up process is complete, the program flow continues to step 1302 in which the frap position of the pulley is verified or established. According to the flowchart of FIG. 29, a determination is made in step 1304 whether a frap position flag stored in memory of the controller is set to “false”, indicating that the motor/pulley has not been moved to the frap position. If so, then flow continues to step 1305 in which the pulley is moved to its home, or fully extended, position and the encoder pulse count is set to zero to establish a baseline for future readings of the encoder 39 as the pulley rotates from its home position. It can be appreciated that this calibration occurs before the wrap 12, 12', 1200 is wrapped around the patient’s limb. The goal is to ensure that the pull strap 20 is fully unwound prior to calibration of the frap position. Then, in step 1306 the pulley is rotated to the frap position, which slightly retracts the pull strap 20. In a specific embodiment, the frap position is a partial rotation of the pulley, such as 325 step rotation from the home position, as discussed above. The frap flag is then set to “true” and the calibration subroutine exits to the next step 1310. It should be appreciated that at the end of the calibration process, the pulley is at the frap position in which the pull strap is slightly retracted and the frap flag is set to true, meaning that the frap position has been set.

Returning to the flowchart of FIG. 28, once the frap position has been established for the controller, in the next step 1310 the controller is attached to the wrap 12, 12', 1200 as described above. When the controller is mounted on the DVT cuff strap, the strap is authenticated in step 1311 and verified in step 1312, as described above, to ensure that a proper controller/strap combination is being used. If the strap is verified, the DVT cuff strap is pre-tensioned in step 1312 according to the flowchart of FIG. 30. The pre-tension adjustment is based on the compression force generated by the wrap as it is tightened on the patient’s limb by the motor, and on the encoder pulse count indicative of the amount of rotation of the pulley 34. In one feature of the DVT cuffs disclosed herein, the force generated by the compression device is determined from the current load on the motor 32. As a result, the compression force being applied by the DVT cuff can only be determined while the motor is operating.

Figure 30:
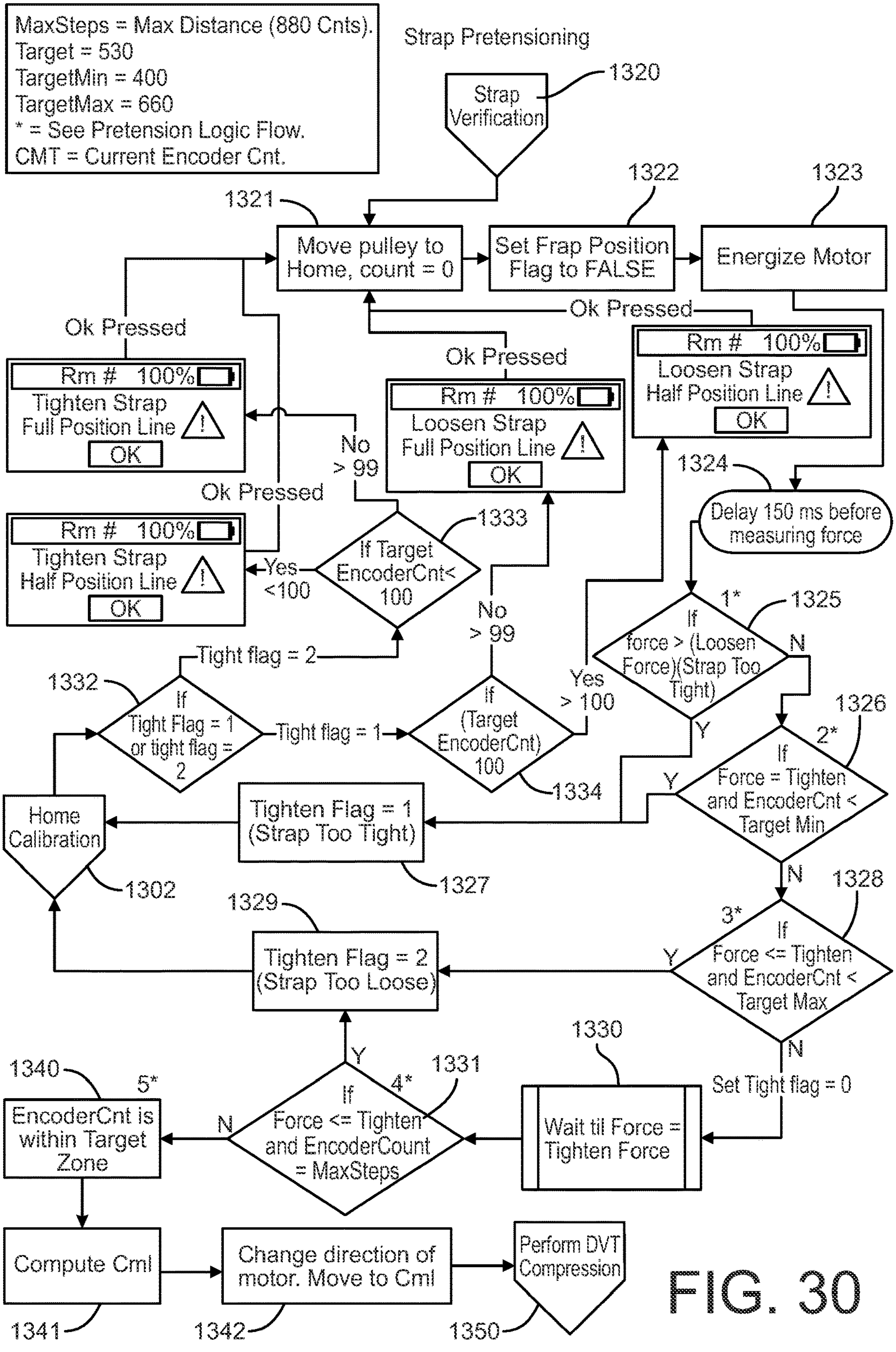
FIG. 30 is a flowchart of controller operation for pretensioning the wrap disclosed herein prior to use in DVT prophylaxis.
Figure 31:
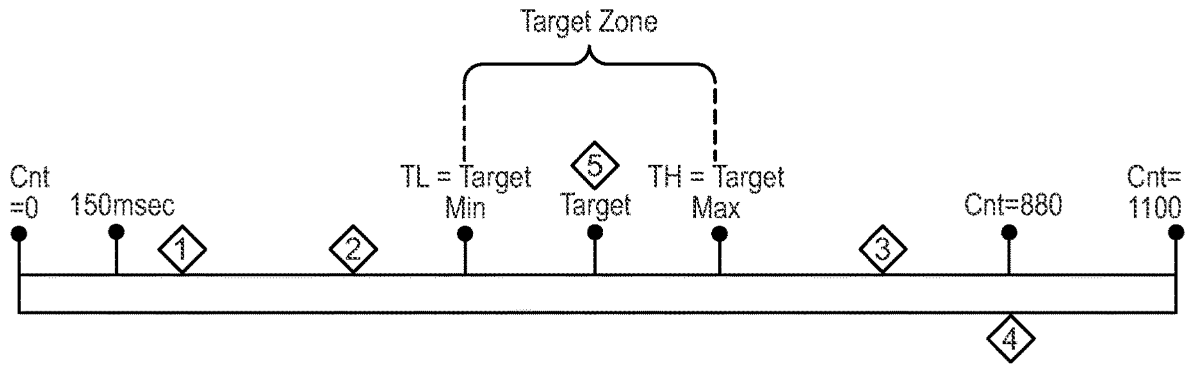
FIG. 31 is chart of encoder pulse counts during operation of the wrap in the pretensioning operation of FIG. 30.

In the pretensioning protocol 1320 of FIG. 30, the pulley 20 is moved to its home position with the encoder pulse count set to zero in step 1321. The frap position flag is set to “False” in step 1322 to indicate that the pull strap is no longer in the frap position. The motor is energized in step 1323 and, after a predetermined delay necessary for the motor current load to be determined, the force exerted by the wrap on the patient is measured in step 1324. In a specific embodiment, the delay is 150 milliseconds. In step 1325 the measured force at the time delay is compared to a maximum threshold force—“loosen force”—which indicates that the strap is too tight. In a specific embodiment, the “loosen force” is 7.5 lbs. For reference, FIG. 31 shows the progression of encoder pulse counts as the pulley is rotated in relation to a target zone of operation of the DVT cuff for DVT prophylaxis operation. The target zone is defined by a target minimum number of encoder pulse counts—TL—and a target maximum—TH. This zone represents the optimal starting position of the pulley and pull strap, and thus the strap tension, for effective DVT prophylaxis compression. The goal of this pretensioning logic is to ensure that the force generated by the wrap and the number of encoder counts fall within the target zone.

Figure 29:
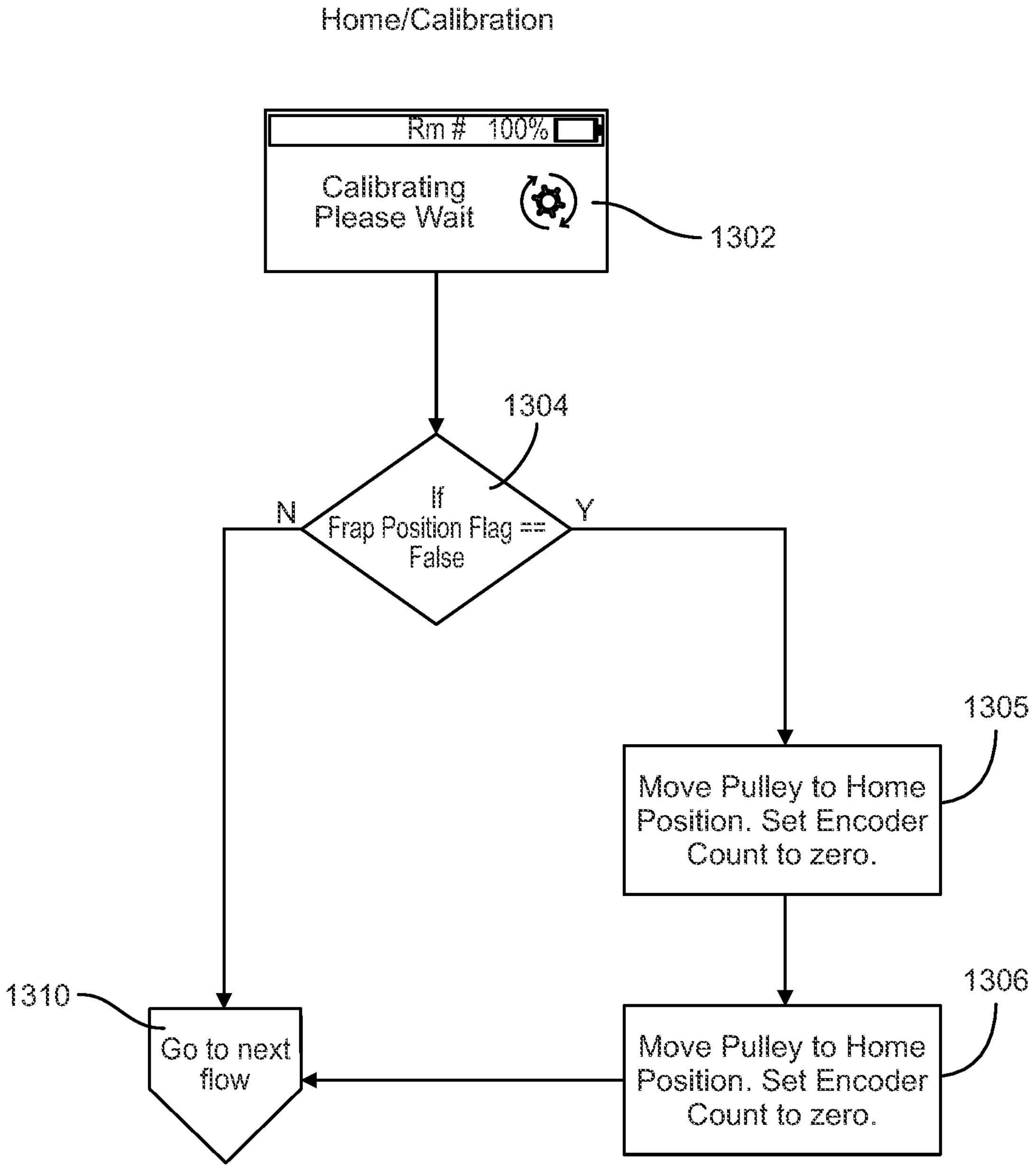
FIG. 29 is a flowchart of controller operation to establish a frap position for the wrap disclosed herein.

Returning to FIG. 30, a “yes” answer to the conditional in step 1325 corresponds to position *1 in the graph of FIG. 31 in which the pulley has not yet rotated to the target zone but the force generated by the DVT cuff exceeds the threshold or “loosen” force. If the “loosen force” has not been exceeded, then the encoder pulse count is compared to the target minimum value TL in step 1326. As discussed above, the target minimum TL corresponds to a minimum amount that the pull strap 20 is been wound onto the pulley 34 for the proper starting position of the pulley and pull strap. In addition, the measured force is compared to a desired force—“tighten”—which represents the optimum starting force or pre-tension for the DVT cuff within the target zone of FIG. 31. A “yes” answer for the conditional of step 1326 corresponds to the position *2 in FIG. 31, meaning that the DVT cuff has reached the optimum starting force in too few rotational steps of the motor/pulley for effective operation of the DVT cuff. If the “loosen force” has been exceeded (step 1325), or if the encoder pulse count is less than the target minimum when the measured force equals the “tighten” force, a “tighten flag” is set to a value of “1” in step 1327 indicating that the strap 12, 12', 1200 is too tight on the patient to allow for proper prophylaxis compression. In this event, the pretensioning protocol returns to step 1302 to recalibrate the frap position of the cuff (FIG. 29). At this point, intervention by the caregiver maybe necessary to adjust the wrap on the patient’s limb, such as by loosening the engagement of the end loop 24 of the strap on the D-ring 22.

A “no” answer for the conditionals of steps 1325 and 1326 mean that the maximum force has not been exceeded and that the encoder pulse count is not below the target minimum TL. The pretension logic then proceeds to determine whether the cuff strap is too loose on the patient. In step 1328 a determination is made whether the measured force is less than or equal to the “tighten” force and the encoder pulse count is greater than the target maximum TL. This condition corresponds to position *3 in FIG. 31 in which the pulley has rotated outside the target zone but the measured force still has not reached the desired "tighten" force. In this case, the "tighten flag" is set to a value of "2" indicating that the strap 12, 12', 1200 is too loose on the patient. Control then returns to the calibration protocol of step 1302. Again, caregiver intervention may be required to adjust the engagement of the end loop 24 on the D-ring 22.

If the determination is made in step 1328 that the measured force is greater than the "tighten" force and the encoder pulse count is less than or equal to the target maximum TL, the flowchart proceeds to step 1330. In this step, the motor continues to operate until the measured force reaches the "tighten" force. In step 1331 a determination is made as to whether the encoder pulse count has reached the maximum number of steps, corresponding to position *4 in FIG. 31. If this conditional is answered in the affirmative, the strap is determined to be too loose and control diverts to step 1329 described above. However, if the conditional of step 1331 is answered in the negative, the encoder pulse count is found to be in the target zone in step 1340, corresponding to position 5* in FIG. 31. If the measured force and encoder pulse count place the strap within the target zone, the strap is properly calibrated and ready to perform a DVT prophylaxis on the patient. IN a preferred embodiment, the minimum force for the target zone is 4.0 lbf. Any force below that value means that the strap is too loose on the patient.

In step 1341, the controller can operate in a manner similar to step 1016 (FIG. 21) discussed above. More specifically, a value "cml" is calculated that corresponds to the number of encoder pulses for reverse rotation of the motor, or loosening of the strap, during a compression-release cycle. The number of encoder pulses determined in step 1331 sets the maximum force, and the number of encoder steps "cml" determines the pretension force, thus bounding the forward and reverse motor rotation. Once that calculation is made, the motor is reversed in step 1342 and the motor and strap are moved to the "cml" position. Then, the DVT compression process commences in step 1350.

When the encoder pulse count and force measurement fall outside the target zone, such as at the positions 1*, 2*, 3* and 4*, caregiver intervention is required to re-adjust the wrap on the patient. If the strap is too tight in position *1 or 2*, a "tighten flag" value is set to "1". If the strap is too loose in position *3 or *4, the "tighten flag" value is set to "2". When the process flow has passed to the calibration step 1302, the "tighten flag" is evaluate in step 1332 to determine which message path is applicable. In particular, the strap is too loose, the message path generates a message on the controller of "Tighten Strap". Similarly, if the strap is too tight, the message path generates a message of "Loosen Strap". At the same time, the processor can generate a warning signal to draw the caregiver's attention to the error condition messaging.

In one embodiment, the processor can indicate to the caregiver the degree of loosening or tightening that is necessary to bring the compression cuff into the target zone. This determination is based on the encoder pulse count, as reflected in conditionals 1333, 1334. In particular, the conditionals determine the difference between the target encoder pulse count value and the measured encoder pulse count value. For a strap that is too loose, conditional 1333 evaluates the difference between the target value at position *5 (FIG. 31) of the target zone and the current encoder pulse count at positions 1* or 2*. If that difference is less than 100 counts, the strap need only be tightened to a "half position line" identified on the strap itself. Alternatively, if the count difference is greater than 100, the caregiver is direct to tighten the strap a "full position line" on the strap. A similar evaluation occurs in conditional 1334 for a strap that is too tight, based on the difference between the target value at position 5* and the current encoder pulse count at positions 3* or 4*. In this case, the strap is loosened to the full or half position lines on the strap. In one embodiment, the target value at position 5* is 530. Then, for conditional 1333 the decision threshold is at 530−100=430 and for conditional 1334 the threshold value is 530+100=630

It can be appreciated that the controller and associated software can continuously monitor the force exerted by the wrap on the patient, by way of the current driving the motor. If the sensed force falls outside the desired minimum and maximum forces an alarm can be initiated to inform the caregiver that adjustment is required. In this instance, the controller can immediately loosen the cuff to the home position of the pulley, de-energize the motor, and provide a message indicating whether the strap is too loose or too tight on the patient.

The present disclosure should be considered as illustrative and not restrictive in character. It is understood that only certain embodiments have been presented and that all changes, modifications and further applications that come within the spirit of the disclosure are desired to be protected.

What is claimed is:

1. A compression device comprising:

a flexible elongated wrap sized to encircle a limb of a patient, said wrap including a first end and an opposite second end, the second end configured to form a loop to adjust the length of the wrap from the first end to the loop, said first end including an end portion defining a slot therethrough sized to receive said second end of said wrap to form said loop;

a controller including;

an electric motor driving a rotating pulley;

a current sensor to sense the current driving said electric motor;

an encoder for generating a pulse for each of a predetermined amount of rotation of the pulley;

a pull strap attached to the pulley to be wound on the pulley as the pulley is rotated by the motor in a compression direction and to be unwound from the pulley as the pulley is rotated in a loosening direction, said pull strap configured to be removably engaged to said second end of said wrap; and a processor configured and operable for controlling operation of the motor to rotate the pulley in said compression direction to wind said pull strap on the pulley to generate a pre-determined compression force on the limb of the patient encircled by the wrap and to rotate the pulley in said loosening direction to unwind the pull strap from the pulley to reduce the compression force on the limb according to a predetermined compression protocol, said processor further configured and operable;

to determine a force applied by the wrap as a function of the sensed driving current for the motor;

to generate an encoder pulse count corresponding to a count of a number of pulses generated by said encoder as said pulley rotates to determine a travel amount corresponding to a distance that the pull strap has wound onto or unwound from said pulley;

to stop the rotation of the pulley in the compression direction when the pulse count reaches a pre-determined pulse count value indicative of a maximum desired compression in the pre-determined compression protocol;

to establish an optimum pretension in the wrap when the wrap is wrapped around the limb of a patient corresponding to a frap position of the wrap and a target force applied by the wrap; and then to initiate a DVT compression prophylaxis protocol on the patient in which the wrap is repeatedly tightened from the frap position and loosed to return to the frap position.

2. The device of claim 1, wherein the processor is configured and operable to establish the optimum pretension of the wrap by determining if the wrap is too tight on the patient by:

energizing the electric motor to wind the pull strap onto the pulley to tighten the wrap on the patient's limb;

after a time delay, measuring the force applied by the wrap at the time delay;

if the force exceeds a maximum threshold force value, generating a notification that the wrap is too tight;

if the force does not exceed the maximum threshold force value, comparing the encoder pulse count at the time delay to a target minimum pulse count value; and if the encoder pulse count at the time delay is less than the target minimum pulse count value, generating a notification that the wrap is too tight.

3. The device of claim 1, wherein the processor is configured and operable to establish the optimum pretension of the wrap by determining if the wrap is too loose on the patient by:

energizing the electric motor to wind the pull strap onto the pulley to tighten the wrap on the patient's limb;

after a time delay, measuring the force applied by the wrap at the time delay;

if the force is less than an optimum force value, and if the encoder pulse count at the time delay is greater than a target maximum pulse count value, generating a notification that the wrap is too loose;

if the force is less than an optimum force value and the encoder pulse count at the time delay is less than the target maximum pulse count value, further operating the motor until the measured force equals the optimum force value; and if the encoder pulse count when the measured force equals the optimum force value equals a maximum encoder pulse count value, generating a notification that the wrap is too loose.

4. The device of claim 1, wherein the processor is configured and operable to establish the optimum pretension of the wrap by determining if the wrap is too tight or too loose on the patient by:

energizing the electric motor to wind the pull strap onto the pulley to tighten the wrap on the patient's limb;

after a time delay, measuring the force applied by the wrap at the time delay;

if the force exceeds a maximum threshold force value, generating a notification that the wrap is too tight;

if the force does not exceed the maximum threshold force value, comparing the encoder pulse count at the time delay to a target minimum pulse count value;

if the encoder pulse count at the time delay is less than the target minimum pulse count value, generating a notification that the wrap is too tight;

if the force is less than an optimum force value, and if the encoder pulse count at the time delay is greater than a target maximum pulse count value, generating a notification that the wrap is too loose;

if the force is less than an optimum force value and the encoder pulse count at the time delay is less than the target maximum pulse count value, further operating the motor until the measured force equals the optimum force value; and if the encoder pulse count when the measured force equals the optimum force value equals a maximum encoder pulse count value, generating a notification that the wrap is too loose.

* * * * *